United States Patent
Janda et al.

(10) Patent No.: US 12,440,278 B2
(45) Date of Patent: Oct. 14, 2025

(54) AUTOMATED TRANSOSSEOUS ELEMENT PLANNING FOR ORTHOPEDIC DEVICES

(71) Applicants: Smith & Nephew, Inc., Memphis, TN (US); Smith & Nephew Orthopaedics AG, Zug (CH); Smith & Nephew Asia Pacific PTE. Limited, Singapore (SG)

(72) Inventors: Haden Janda, Germantown, TN (US); Christin Denmon, Cordova, TN (US); Luke Cranford, Memphis, TN (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 0 days.

(21) Appl. No.: 18/845,732

(22) PCT Filed: Apr. 14, 2023

(86) PCT No.: PCT/US2023/018643
§ 371 (c)(1),
(2) Date: Sep. 10, 2024

(87) PCT Pub. No.: WO2023/205046
PCT Pub. Date: Oct. 26, 2023

(65) Prior Publication Data
US 2025/0213305 A1    Jul. 3, 2025

Related U.S. Application Data

(60) Provisional application No. 63/333,680, filed on Apr. 22, 2022.

(51) Int. Cl.
*A61B 34/10* (2016.01)
*A61B 17/62* (2006.01)
(Continued)

(52) U.S. Cl.
CPC .............. *A61B 34/10* (2016.02); *A61B 17/62* (2013.01); *A61B 17/66* (2013.01); *A61B 34/25* (2016.02);
(Continued)

(58) Field of Classification Search
CPC ......... A61B 17/62; A61B 17/66; A61B 34/25; A61B 34/10; A61B 2034/102; A61B 2034/107; A61B 2034/256
See application file for complete search history.

(56) References Cited

U.S. PATENT DOCUMENTS

| 5,702,389 A | 12/1997 | Taylor |
| 5,728,095 A | 3/1998 | Taylor |

(Continued)

OTHER PUBLICATIONS

Smith & Nephew, "Tibia: Oblique Plane (Left): Apex= Corresponding Point" Method Reference Fragment: Proximal, Lifebridge Health, Trauma & Extremities Training Session Feb. 2018, Sinai Hospital of Baltimore, 5 pages.

(Continued)

*Primary Examiner* — Sameh R Boles
(74) *Attorney, Agent, or Firm* — KDW Firm PLLC

(57) ABSTRACT

A method including: determining a configuration for an orthopedic device to attach with bone segments, the orthopedic device including a proximal ring, a distal ring, and adjustable struts interconnecting the proximal ring and the distal ring; receiving input data for anatomy and boundaries for attachment of the orthopedic device with the bone segments; receiving input data for a level and a position for the proximal ring; determining a number and type of the transosseous elements for attachment of the orthopedic device; determining a final level and position for the distal ring; accessing a data structure including fixations for the transosseous elements; accessing a data structure including reference levels and positions for attachment of transosseous (Continued)

elements to the bone segments; and automatically determining levels and positions for the transosseous elements and the distal ring to avoid impingement of fixations and transosseous elements with struts of the orthopedic device.

15 Claims, 14 Drawing Sheets

(51) Int. Cl.
    *A61B 17/66*     (2006.01)
    *A61B 34/00*     (2016.01)

(52) U.S. Cl.
    CPC ... *A61B 2034/102* (2016.02); *A61B 2034/107* (2016.02); *A61B 2034/256* (2016.02)

(56) References Cited

U.S. PATENT DOCUMENTS

| | | | |
|---|---|---|---|
| 5,891,143 A | 4/1999 | Taylor | |
| 5,971,984 A * | 10/1999 | Taylor | A61B 17/62 606/56 |
| 6,030,386 A | 2/2000 | Taylor | |
| 6,129,727 A | 10/2000 | Austin | |
| RE40,914 E | 9/2009 | Taylor | |
| 2003/0191466 A1 | 10/2003 | Austin | |
| 2004/0073211 A1 | 4/2004 | Austin | |
| 2005/0215997 A1 | 9/2005 | Austin | |
| 2016/0092651 A1 | 3/2016 | Austin | |
| 2017/0348054 A1 | 12/2017 | Kumar | |
| 2020/0390503 A1 | 12/2020 | Casas | |
| 2021/0361322 A1 | 11/2021 | Sun | |
| 2022/0354539 A1 | 11/2022 | Ferrante | |
| 2023/0086184 A1 | 3/2023 | Noblett | |

OTHER PUBLICATIONS

L.N. Solomin et al., Atlas for the Insertion of Transosseous Element Reference Positions, Tribia, 2012, pp. 133-141.

International Search Report and Written Opinion for International Application No. PCT/US2023/018643, filed on Apr. 14, 2023, 17 pages.

* cited by examiner

AUTOMATED TRANSOSSEOUS ELEMENT PLANNING FOR ORTHOPEDIC DEVICES

CROSS-REFERENCE TO RELATED APPLICATIONS

This application is a National Phase filing of International Application No. PCT/US2023/018643, filed Apr. 14, 2023, which application is a non-provisional of, and claims the benefit of the filing date of, U.S. provisional patent application No. 63/333,680, filed Apr. 22, 2022, entitled "Automated Transosseous Element Planning for Orthopedic Devices," the entirety of each application is incorporated by reference herein.

FIELD OF THE DISCLOSURE

The present disclosure relates generally to orthopedic devices, systems, and methods for preplanning of placement of transosseous elements to affix bone segments to fixation hardware and, more particularly, for automated transosseous element planning for orthopedic devices such as an external fixator.

BACKGROUND OF THE DISCLOSURE

People suffer bone fractures each year. In many instances, a person that suffers a bone fracture is required to use an orthopedic device such as, for example, a bone alignment device, a fixation system, a fixator, a spatial frame, a hexapod, etc. (terms used interchangeably herein without the intent to limit or distinguish) to align two or more bones, bone segments, bone pieces, etc. (terms used interchangeably herein without the intent to limit or distinguish). Generally speaking, spatial frames allow for polyaxial movement of the coupled bones and are typically used to keep fractured bones stabilized and in alignment during a treatment period.

The spatial frame may include first and second rings, platforms, frames, bases, etc. (terms used interchangeably herein without the intent to limit or distinguish) intercoupled by a plurality of struts. In use, the struts have adjustable lengths that may be manually adjusted regularly (e.g., daily) in accordance with a prescription or treatment plan (terms used interchangeably herein without the intent to limit or distinguish). As the lengths of the struts are adjusted, the platforms may be brought closer together or moved farther apart. The treatment plan specifies strut length adjustments to be made over time to ensure successful bone alignment.

One known example of a spatial frame is the TAYLOR SPATIAL FRAME® manufactured and sold by Smith Nephew, Inc. The TAYLOR SPATIAL FRAME® is based on the general concept of a Stewart platform. Smith & Nephew, Inc. is the owner of U.S. Pat. Nos. 5,702,389; 5,728,095; 5,891,143; RE40,914, 5,971,984; 6,030,386; and 6,129,727; and U.S. Published patents application Ser. Nos. 20030191466; 2004/0073211; 2005/0215997; and 2016/0092651 that disclose many concepts of and improvements to the Stewart platform based spatial frame, including methods of use, systems, and devices that enhance use of the spatial frame.

Orthopedic surgeons use preoperative planning software to analyze bony and soft-tissue deformities to virtually plan the correction of the deformity. When planning the placement of an external fixator, consideration should be made to the placement of the ring(s) and fixation hardware (for example pins and wires) with respect to the anatomy, bone cut, apex of the deformity, and available space for fixation within the bone segments to be corrected. There is currently no software available to virtually plan fixation placement, further, there is not a software solution to automatically suggest fixation options with respect to the bony anatomy and surgeon preference.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Some examples may include a method to automatically determine levels and positions for transosseous elements. The method may include determining a configuration for an orthopedic device to attach with bone segments, the orthopedic device including a proximal ring, a distal ring, and adjustable struts interconnecting the proximal ring and the distal ring; receiving input data for anatomy and boundaries for attachment of the orthopedic device with the bone segments, wherein the boundaries include a proximal boundary, an intermediate boundary, and a distal boundary; receiving input data for a level and a position for the proximal ring; determining a number and type of the transosseous elements for attachment of the orthopedic device with the bone segments for the proximal ring and the distal ring; determining a final level and position for the distal ring, the final location to be a level and position of the distal ring after completion of a prescription for the orthopedic device; accessing a data structure including fixations for the transosseous elements, the data structure including identifiers and dimensions, the dimensions including overall dimensions for each fixation and specific dimensions for one or more transosseous element attachment locations for each of the fixations; accessing a data structure including safe (or reference) levels and positions for attachment of transosseous elements to the bone segments; and automatically determining levels and positions for the transosseous elements and the distal ring based on the configuration for the orthopedic device, the levels and positions to avoid impingement of fixations and transosseous elements with struts of the orthopedic device during transition from an initial level and position for the distal ring to the final level and position for the distal ring.

Some examples may include a computer-readable storage medium. The computer-readable storage medium may include a plurality of instructions, that when executed by processing circuitry, enable processing circuitry to: determine a configuration for an orthopedic device to attach with bone segments, the orthopedic device including a proximal ring, a distal ring, and adjustable struts interconnecting the proximal ring and the distal ring; receive input data for anatomy and boundaries for attachment of the orthopedic device with the bone segments, wherein the boundaries include a proximal boundary, an intermediate boundary, and a distal boundary; receive input data for a level and a position for the proximal ring; determine a number and type of the transosseous elements for attachment of the orthopedic device with the bone segments for the proximal ring and the distal ring; determine a final level and position for the distal ring, the final location to be a level and position of the distal ring after completion of a prescription for the orthopedic device; access a data structure including fixations for the transosseous elements, the data structure including identifiers and dimensions, the dimensions including overall dimensions for each fixation and specific dimensions for one or more transosseous element attachment locations for each of the fixations; access a data structure including safe (or reference) levels and positions for attachment of transosseous elements to the bone segments; and automatically determine levels and positions for the transosseous elements and the distal ring based on the configuration for the orthopedic device, the levels and positions to avoid impingement of fixations and transosseous elements with struts of the orthopedic device during transition from an initial level and position for the distal ring to the final level and position for the distal ring.

Some examples may include an apparatus. The apparatus may include a memory to include one or more data structures and processing circuitry coupled with the memory to: determine a configuration for an orthopedic device to attach with bone segments, the orthopedic device including a proximal ring, a distal ring, and adjustable struts interconnecting the proximal ring and the distal ring; receive input data for anatomy and boundaries for attachment of the orthopedic device with the bone segments, wherein the boundaries include a proximal boundary, an intermediate boundary, and a distal boundary; receive input data for a level and a position for the proximal ring; determine a number and type of the transosseous elements for attachment of the orthopedic device with the bone segments for the proximal ring and the distal ring; determine a final level and position for the distal ring, the final location to be a level and position of the distal ring after completion of a prescription for the orthopedic device; access a data structure including fixations for the transosseous elements, the data structure including identifiers and dimensions, the dimensions including overall dimensions for each fixation and specific dimensions for one or more transosseous element attachment locations for each of the fixations; access a data structure including safe (or reference) levels and positions for attachment of transosseous elements to the bone segments; and automatically determine levels and positions for the transosseous elements and the distal ring based on the configuration for the orthopedic device, the levels and positions to avoid impingement of fixations and transosseous elements with struts of the orthopedic device during transition from an initial level and position for the distal ring to the final level and position for the distal ring.

Examples of the present disclosure provide numerous advantages. For example, pre-operative planning of transosseous fixation to automatically determine levels and positions for transosseous elements may offer clinical benefits, reduced operating room (OR) time, better functional and aesthetic outcomes, reduced cost, and the like. A surgeon, for instance, may reduce operating room (OR) time by pre-operatively building portions of the orthopedic device, attaching fixations, and the like.

"Transosseous", as illustrated in the accompanying drawings and discussed herein, may mean into a bone (i.e., not exiting another side of the bone) or may mean into one side of a bone and out another side of the bone. Fixations include transosseous elements such as pins, wires, and/or the like to attach a fixator to a bone. The transosseous elements, for instance, may include pins that enter one side of the bone to attach or couple to the bone and/or may include wires that enter one side of the bone and exit another side of the bone to attach the bone to the fixator.

Pre-operative planning of transosseous fixation may offer the benefit of greater biomechanical stability. By pre-planning greater fixation spread axially and transversely within the anatomy to be corrected, biomechanical stability and strength will be increased. Biomechanical stability is important in an external fixation construct to ensure proper bone correction and healing/consolidation. In scenarios where fixation location is minimal (for example, in a proximal tibia correction, between the knee joint and bone cut site), pre-planning may optimize frame stability within the given anatomy using the hardware available to the user. The risk of use error may also be reduced when pre-planning and automatically maximizing the biomechanical stability of the construct.

In scenarios where the anatomy is limited for fixation placement, the pre-planning of fixation may offer clinical and aesthetic benefits by, for example, reducing obligatory translation required to align the axes of the bone segments. A large amount of obligatory bony translation, presenting as a large bony bump, may not be tolerated well by the patient, especially in anatomy without significant soft tissue coverage (for example, antero-medial aspect of the tibia or distal radius).

Pre-planning transosseous fixation may optimize stress distribution within the bone and perhaps prevent bone fracture and comminution between fixation elements and the bone cut. Cost may be reduced by ensuring the proper number, type, and placement of fixation to obviate excess fixation, fixation revision (with additional points of fixation), and/or fixation/bone-interface failure.

Pre-planning transosseous fixation may allow the user to ensure stability of the construct while avoiding certain hard or soft tissue structures at risk, or other implanted materials (for example, a skin flap, area of compromised bone, nerve and cardiovascular structures, bone plates and the like). Automated transosseous fixation planning may prevent impingement on any other hardware in the frame construct throughout the entirety of the correction, for example, prevent fixation colliding with a strut (telescopic elements) during correction and prevent impingement with another transosseous element during fixation placement. The examples described herein may offer an automated method to optimize transosseous fixation to realize one of, a combination of one or more of, or all the benefits described above.

Further features and advantages of at least some of the examples of the present disclosure, as well as the structure and operation of various examples of the present disclosure, are described in detail below with reference to the accompanying drawings.

BRIEF DESCRIPTION OF THE DRAWINGS

By way of example, specific examples of the disclosed device will now be described, with reference to the accompanying drawings, in which.

Figure 1:
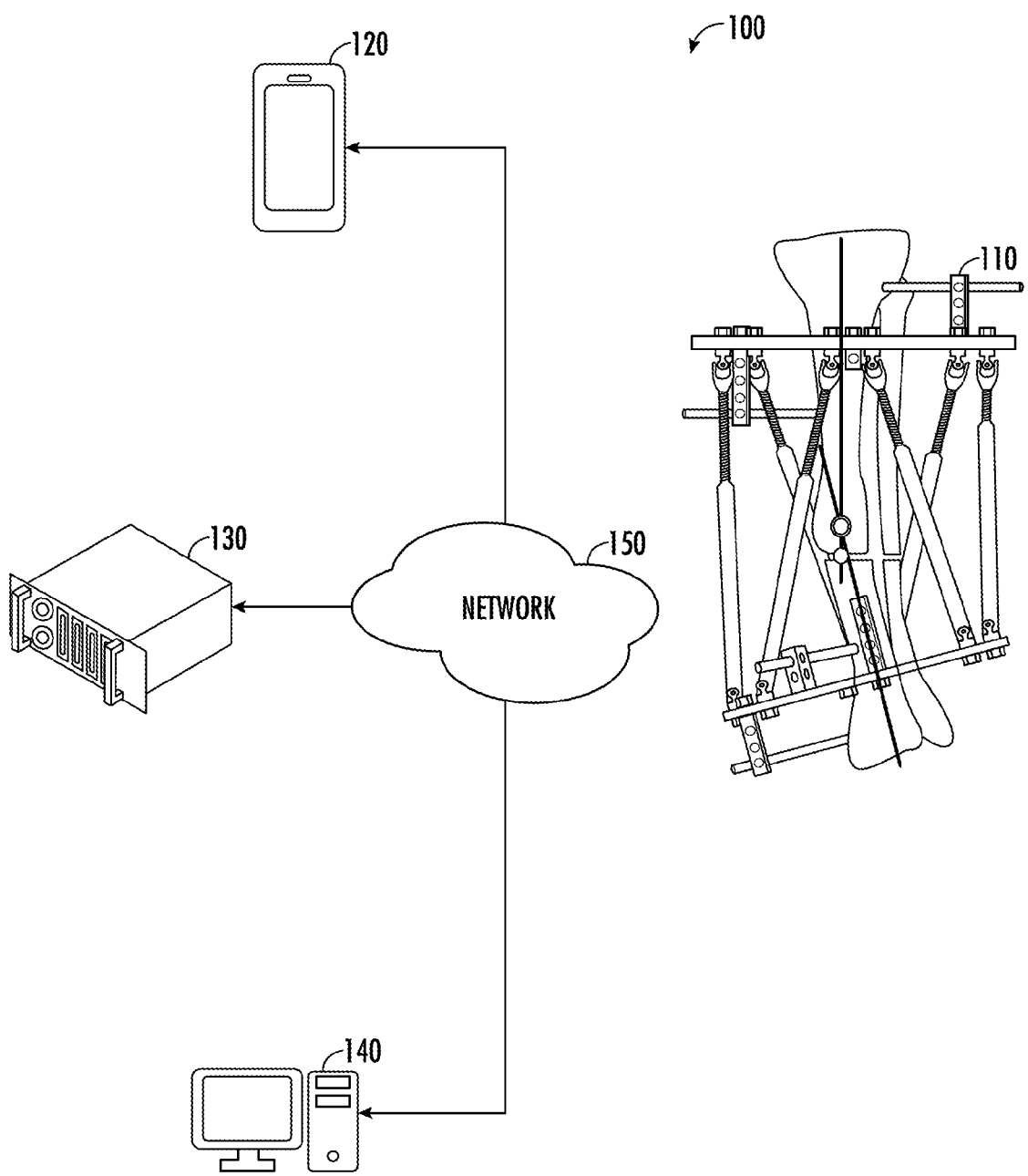
FIG. 1 illustrates a system for automatically determine levels and positions for transosseous elements.

The drawings are not necessarily to scale. The drawings are merely representations, not intended to portray specific parameters of the disclosure. The drawings are intended to depict various examples of the disclosure, and therefore are not considered as limiting in scope. In the drawings, like numbering represents like elements.

DETAILED DESCRIPTION

Various features or the like of automated determination of levels and positions for transosseous elements will now be described more fully herein with reference to the accompanying drawings, in which one or more features of automated determination of levels and positions for transosseous elements will be shown and described. It should be appreciated that the various features may be used independently of, or in combination, with each other. It will be appreciated that automated determination of levels and positions for transosseous elements as disclosed herein may be embodied in many different forms and may selectively include one or more concepts, features, or functions described herein. As such, the automated determination of levels and positions for transosseous elements should not be construed as being limited to the specific examples set forth herein. Rather, these examples are provided so that this disclosure will convey certain features of the automated determination of levels and positions for transosseous elements to those skilled in the art.

Examples may include transosseous logic circuitry to digitally assess and automatically suggest placement of external fixator hardware with respect to a deformity, corticotomy location, anatomic landmarks, and surgeon preference. In some examples, the transosseous logic circuitry may also optimize fixation for frame stability as well as ensure fixation placement is valid throughout correction without impinging on the moving struts. Impingement is a growing concern as motorized struts are larger in size than the current, manually operated struts.

Transosseous logic circuitry may automatically suggest fixation hardware types, hardware sizes, and hardware placement location to provide a three-dimensional (3D) model of the construct with a pre-operative fixation plan based on user inputs from two-dimensional (2D) anteroposterior/sagittal (AP/LAT) imaging and/or 3D imaging techniques. This will advantageously allow surgeons to preoperatively build a frame with fixation hardware pre-planned. Note that the "location" of, e.g., a fixation, as discussed herein may refer to the level and position such as the reference (or safe) levels and positions described in FIGS. 2E-2G.

While this solves problems for the current standard of care, it will also provide a foundation for robotic-assisted application of external fixators. Since a 3D model of the construct is generated with fixation in place, transosseous logic circuitry may also detect and prevent fixation impingement on the moving struts throughout correction. This is especially important when motorized struts (autostruts) are larger in size than the current manually operated struts. For example, one robotic-assisted application of external fixators is the robotic-assisted placement of the fixation hardware at the corticotomy site to optimize functional and aesthetic outcomes in limb reconstruction.

In many examples, the transosseous logic circuitry may begin with user input data (pre-operative user input data). The user input data may include provision of 2D AP/LAT images, or 3D images, of a bone or bone segments to correct with an orthopedic device as well as identification of the bone to be corrected. For instance, the user may identify the 2D AP/LAT images, or 3D images, and may identify the bone as, e.g., a left tibia, a right tibia, a left femur, a right femur, a left fibula, a right fibula, a left humerus, a right humerus, or any other bone that can be repaired with an internal or external fixator. Some examples may offer, e.g., a pull-down menu, a list, or graphical icons or pics in a user interface to facilitate identification of the bone to be corrected. In some examples, when a user initiates a new file, the user may identify the bone for correction by selection of images of the bone that may include, in the name of the files or in metadata associated with the images, identification of the bone to be corrected. In such examples, the user may confirm the identification of the bone for correction.

In other examples, the user may input the dimensions of the bone to be corrected and the transosseous logic circuitry may optionally generate an illustrative image of the bone with the deformity as described by the dimensions input. In such examples, the user may update the dimensions at any point during the automated determination of levels and positions for transosseous elements and the transosseous logic circuitry may automatically correct the levels and positions for transosseous elements accordingly. In further examples, a user may replace illustrative images with actual 2D AP/LAT images (or 3D imaging) of the bone to be corrected and the transosseous logic circuitry may automatically update a display of an orthopedic device illustrating the levels and positions for transosseous elements.

Some examples may suggest fixation hardware based on the bone identified for correction. For instance, such examples may access a data structure such as a database that includes fixation hardware identified for use on various bones. The database may also include dimensions for the fixation hardware. In some examples, the transosseous logic circuitry may access a data structure including components for attachment of transosseous elements as well as dimensions for transosseous elements such as pins, wires, rods, and/or the like.

In addition to user inputs, the transosseous logic circuitry may access user preferences related to level and positioning of transosseous elements. The user may have many different preferences related to different bones, different orthopedic devices, and/or the like. Some example preferences may relate to setting fixation boundaries about features or structures to avoid damage, setting number and types of transosseous elements for each ring of an external fixator, setting a proximal and/or distal ring block option for an orthopedic device, and/or the like. For example, the user may include a preference not to locate a transosseous element within, e.g., 20 millimeters (mm) of a knee joint; not to locate a transosseous element within, e.g., 15 mm of an ankle joint; not to locate a transosseous element within, e.g., 10 mm of a bone cut; not to locate a transosseous element within, e.g., 15 mm of a bone cut; and/or the like. Furthermore, the user may set a preference to include, e.g., 3 pins per ring for an external fixator and set the default preference to use two rings.

After entry of the user input data and determination of user preferences, the transosseous logic circuitry may automatically determine an output based on the input data, the user preferences, fixations available via a data structure, and a data structure including reference (or safe) fixation levels and positions (or angles). The reference (or safe) fixation levels and angles may include a reference levels and positions to minimize soft tissue displacement and avoid major neurovascular bundles. Various textbooks, journal articles, and studies discuss levels and positions for transosseous elements for various bones. The transosseous logic circuitry may access a data structure including levels and positions for transosseous elements for the bone to be corrected to facilitate selection of levels and positions. The transosseous logic circuitry may also identify fixations from a data structure to couple the transosseous elements with the orthopedic device as well as locations on the rings to mount the fixations. In many examples, the transosseous logic circuitry may determine levels and positions to maximize structural support of the ring on a bone segment and to avoid impingement of the transosseous elements with each other and other structures both external to the bone segment during correction of the bone and internal to the bone segment during installation of the transosseous elements.

An example of a system 100 for treating a patient is illustrated in FIG. 1. The system illustrated is only one example of a system that includes an example of automated determination of levels and positions for transosseous elements discussed herein. Other systems may use other types of orthopedic devices and/or may perform automated determination of levels and positions for transosseous elements for, e.g., navigated surgery such as a navigated surgery to install an orthopedic device such as the external fixator 110.

The system 100 may include the external fixator 110 configured to be coupled to a patient, a patient device 120 connected to a network 150, a server 130 connected to the network 150, and a Health Care Practitioner (HCP) device 140 connected to the network 150. The illustrated external fixator 110 may include, e.g., a six-axis external fixator. In other examples, an external fixator 110 may be any device capable of coupling to two or more bone segments and moving or aligning the bone segments relative to one another.

The patient device 120 illustrated is a handheld wireless device. In other examples, a patient device may be any brand or type of electronic device capable of executing a computer program and outputting results to a patient. For example, and without limitation, the patient device 120 may be a smartphone, a tablet, a mobile computer, or any other type of electronic device capable of providing one or both of input and output of information. In some examples, the patient device 120 may couple with the network 150 via wired and/or wireless connections to facilitate use of the patient device 120 to display, implement, and/or provide feedback related to implementation of a prescription for the external fixator 110.

The network 150 may be one or more interconnected networks, whether dedicated or distributed. Non-limiting examples include personal area networks (PANs), local area networks (LANs), wide area networks (WANs), metropolitan area networks (MANs), private and/or public intranets, the Internet, cellular data communications networks, switched telephonic networks or systems, and/or the like. Connections to the network 150 may be continuous or may be intermittent, only providing for a connection when requested by a sending or receiving client.

The server 130 is shown connected to the network 150 in FIG. 1. The server 130 may be a single computing device in some examples or may itself be a collection of two or more computing devices and/or two or more data storage devices that collectively function to process data as described herein. The server 130, or any one or more of its two or more computing devices, if applicable, may connect to the network 150 through one or both of firewall and web server software and may include one or more databases. If two or more computing devices or programs are used, the devices may interconnect through a back-end server application or may connect through separate connections to the network 150. The server 130 or any component server device of the system may include integrated or separate computer readable media containing instructions to be executed by the server computer. For example, and without limitation, computer readable media may be any volatile or non-volatile media integrated into the server 130 such as a hard disc drive, random access memory (RAM), or non-volatile flash memory. Such computer readable media, once loaded into the server 130 as defined herein, may be integrated, non-transitory data storage media. In some examples, a server 130 may include a storage location for information that will be eventually used by the patient device 120, the server 130, and/or the HCP device 140.

When stored on the server 130, memory devices of the server 130, as defined herein, provide non-transitory data storage and are computer readable media containing instructions. Similarly, computer readable media may be separable from the server 130, such as a flash drive, external hard disc drive, tape drive, Compact Disc (CD), or Digital Versatile Disc (DVD) that is readable directly by the server 130 or in combination with a component connectable to the server 130.

In some examples, transosseous logic circuitry of the server 130 may communicate with the HCP device 140 via, e.g., a web browser or other client software installed on the HCP device 140 (transosseous logic circuitry) to facilitate interaction with a user such as an orthopedic surgeon to automatically determine levels and positions for transosseous elements based on a set of one or more images such as radiographs, pre-operative user input data, user preferences, and data in data structures such as one or more databases. In some examples, the transosseous logic circuitry of the server 130 may interact with the user to adjust the levels and positions for transosseous elements. In other examples, the transosseous logic circuitry may reside on and may include, e.g., code for execution by a processor of the HCP device 140 so that a network 150 may not be required.

The one or more images may be a single image such as a radiograph of a bone for a two-dimensional (2D) description of a deformity of the bone and may include two 2D images or one 3D image for a three-dimensional description of the deformity. Additional medical imaging (e.g., magnetic resonance imaging (MRI), computed tomography (CT), x-ray, ultra-sound, etc.) can be used to create a three-dimensional (3D) model of the patient's bone to analyze deformity parameters of the bone. In some examples, the one or more images may include additional images if the code is part of a more complex software application that offers functionality in addition to automated determination of levels and positions for transosseous elements. For instance, a hexapod software application may use deformity parameters from a deformity analysis and additional inputs to determine a strut adjustment schedule or prescription for the external fixator 110. In some examples, the transosseous logic circuitry may use one or more or any combination of edge and image recognition software, x-ray markers, manual inputs, automated inputs, augmented reality systems, and sensor technologies.

In some examples, the transosseous logic circuitry may include code executing on the HCP device 140 and the server 130 and may include one or more databases operating on the server 130. The databases may include one or more data structures including multiple orthopedic devices for one or more different bones and fixations to attach transosseous elements with the orthopedic devices. The databases may include dimensions for the orthopedic devices and the fixations. In some examples, the databases may also indicate several orthopedic devices and the fixations. In further examples, the databases may include a reservation system to reserve orthopedic devices and the fixations to assure that the reserved orthopedic devices and fixations are available for a scheduled surgery to install an orthopedic device with transosseous elements such as the external fixator 110.

The transosseous logic circuitry may interact with a user to upload one or more images of the bone and obtain pre-operative input data for determining the locations of an orthopedic device and transosseous elements with respect to the bone. The input data may include an anatomy of the bone such as a left mid-shaft tibia and may, in some examples, identify available orthopedic devices for the bone such as the external fixator 110. In some examples, the anatomy of the bone may be included in the file name or metadata of the one or more images uploaded by the user.

The user may also provide user input data to describe the proximal bone boundary, the distal bone boundary, the proximal (reference) ring location, an intermediate bone boundary at, e.g., the apex of the deformity of the bone, and a neutral frame height for the orthopedic device. Based on the input from the user, a data structure including reference (or safe) transosseous element levels and positions, as well as default and/or user preferences related to the number of rings, the number and types of transosseous elements, fixation boundaries, and/or the like, the transosseous logic circuitry may determine levels and positions for the transosseous elements.

In many examples, the transosseous logic circuitry may display a 2D or 3D model of the orthopedic device with the transosseous elements attached to the bone in the one or more images uploaded. In some examples, the transosseous logic circuitry may also display a corrected bone at the end of a prescription for the orthopedic device based on the neutral height for the rings of the orthopedic device.

In many examples, the automated determination of the levels and positions for the transosseous elements may involve determining levels and positions that avoid impingement of the transosseous elements with one another, with struts and rings of the orthopedic device, and neurovascular bundles about the bone. In many examples, the automated determination of the levels and positions for the transosseous elements may also attempt to minimize soft tissue displacement.

In some examples, the transosseous logic circuitry may allow the user to graphically adjust the level and/or orientation of the transosseous elements and/or fixations by dragging the transosseous elements and/or fixations to new levels and/or orientations until satisfied. Some examples include tools to adjust the level and/or orientation of the transosseous elements and/or fixations by editing the levels and positions via a keyboard or by otherwise editing the levels and positions graphically on a user interface of the transosseous logic circuitry. In further examples, the user may change, add, and/or remove fixations, struts, rings, and/or the like.

In many examples, the transosseous logic circuitry may record the adjustments of the levels and/or orientations of the transosseous elements and/or other fixations, as well as additions, modifications, and deletions of fixations including transosseous elements in memory. In many examples, the transosseous logic circuitry may respond to the changes automatically or responsive to a user request to perform an impingement analysis. For example, the transosseous logic circuitry may perform real-time impingement analysis and highlight the transosseous elements and/or other fixations involved with the impingement at any point during a prescription. In further examples, the transosseous logic circuitry may highlight the changes introduce by the user that cause the impingement.

In some examples, the transosseous logic circuitry may perform an impingement analysis based on one or more correction paths for the struts, distal ring(s), transosseous elements coupled with the distal ring(s) and other fixations. In some examples, the transosseous logic circuitry may determine movements required to achieve the neutral orthopedic device height or final orthopedic device configuration based on pre-operative user inputs of the reference ring location, bone boundaries, and the neutral orthopedic device height. In other examples, the transosseous logic circuitry may operate in conjunction with a prescription generation software that may provide one or more correction paths to the transosseous logic circuitry to perform impingement analyses for the orthopedic device with the transosseous elements and other fixations.

Note that examples can use images captured from any angle or orientation and movements of bone segments may be defined in relation to the coordinate system implemented by the transosseous logic circuitry. Thus, references to vertical or horizontal movements relative to a 2D or 3D image may not reflect the actual components of such movements determined and stored by the transosseous logic circuitry unless properly oriented by the user. For instance, a vertical movement with respect to a particular image may represent movement along an x-axis, a y-axis, a z-axis, or any combination thereof, with respect to the coordinate system implemented by the transosseous logic circuitry. Thus, the transosseous logic circuitry may record such movements as a tuple or vector such as (x,y,z), where x, y, and z represent numbers indicative of movement in units such as millimeters or centimeters along the x-axis, y-axis, and z-axis, respectively. A movement of zero, in some examples, may represent no movement, a negative movement may represent movement in a first direction with respect to an axis, and a positive movement may represent movement in a second direction with respect to the axis.

AP and LAT views are common practice for radiographs of fractures and bone deformities, but examples are not limited to AP and LAT view images. Furthermore, as long as each of the images has a known scale, the images do not have to be the same scale. The transosseous logic circuitry may translate or convert scales to a selected or default scale implemented by the transosseous logic circuitry and translate or convert movements associated with bone segments and struts in images to a coordinate system implemented by the transosseous logic circuitry.

Note that examples are not limited to the transosseous logic circuitry residing in the server 130. The transosseous logic circuitry may reside in whole or in part in the HCP device 140. The transosseous logic circuitry may reside in whole or in part in the server 130. Furthermore, the transosseous logic circuitry may reside partially in multiple compute servers and data storage servers managed by a management device and operating as the server 130. The transosseous logic circuitry may also or alternatively reside partially in multiple computers and/or storage devices such as the HCP device 140. Where the transosseous logic circuitry may reside partially in multiple computers, the transosseous logic circuitry may include management logic circuitry to manage multiple local and/or remote resources.

The HCP device 140 is shown connected to the network 150. The HCP device 140 illustrated is a desktop personal computer. In other examples, the HCP device 140 may be any brand or type of electronic device capable of executing a computer program and receiving inputs from or outputting information to a user. For example, and without limitation, the HCP device 140 may be a smartphone, a tablet computer, or any other type of electronic device capable of providing one or both of input and output of information. Such a device may provide a user interface for data input, transosseous element and/or fixation modification, as well as communication with a patient, another HCP, or a device or system manufacturer.

An HCP device such as the HCP device 140 may be connected to the network 150 by any effective mechanism. For example, and without limitation, the connection may be by wired and/or wireless connection through any number of routers and switches. Data may be transmitted by any effective data transmission protocol. The HCP device 140 may include integrated or separate computer readable media containing instructions to be executed by the HCP device 140. For example, and without limitation, computer readable media may be any media integrated into the HCP device 140 such as a hard disc drive, RAM, or non-volatile flash memory. Such computer readable media once loaded into the HCP device 140 as defined herein may be integrated and non-transitory data storage media. Similarly, computer readable media may be generally separable from the HCP device 140, such as a flash drive, external hard disc drive, CD, or DVD that is readable directly by the HCP device 140 or in combination with a component connectable to the HCP device 140.

Figure 2A:
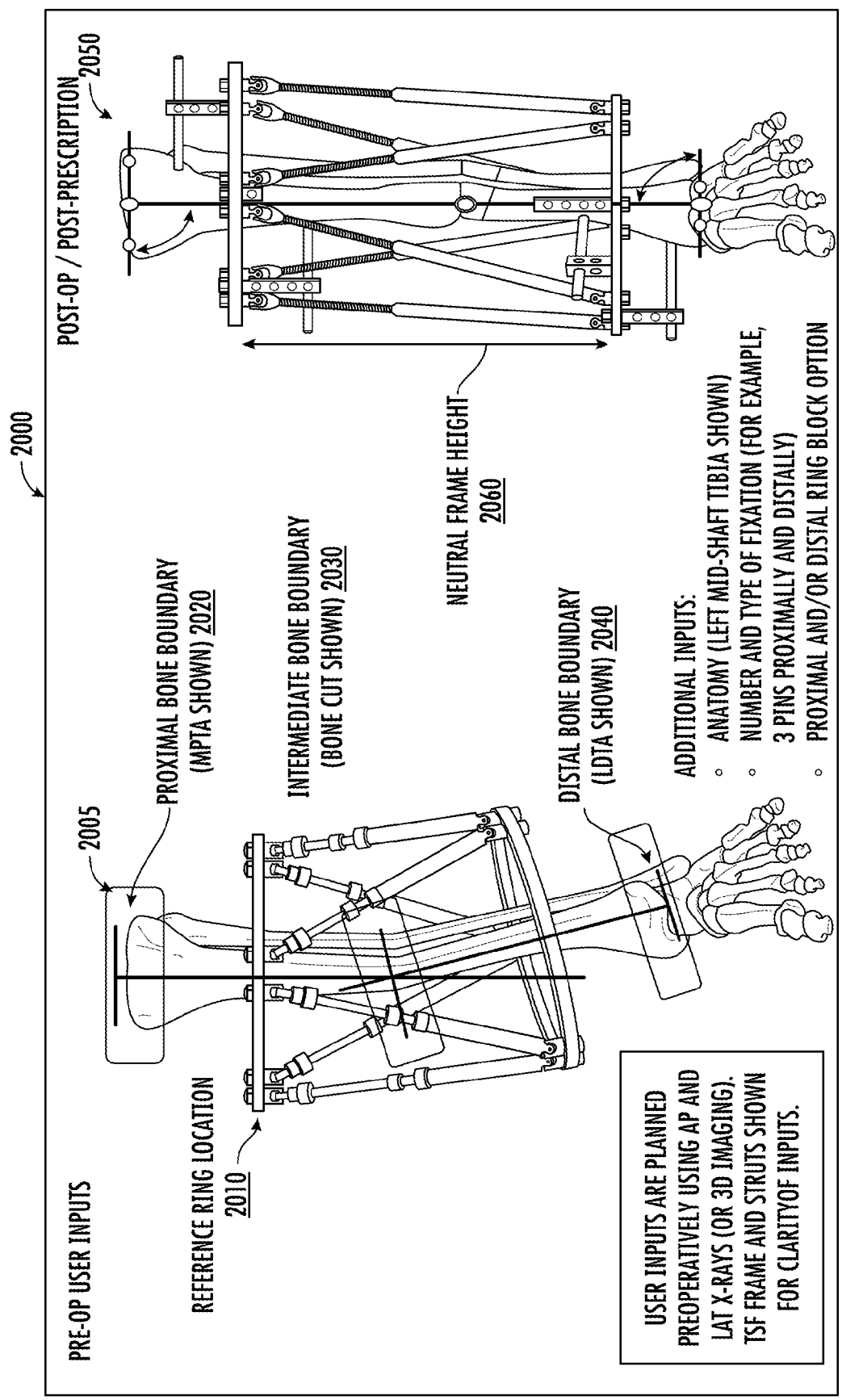
FIG. 2A illustrates a graphical display for user inputs in accordance with examples such as the system in FIG. 1.

FIG. 2A illustrates a graphical display 2000 generated by transosseous logic circuitry for user inputs in accordance with examples such as the system in FIG. 1. In some examples, the graphical display 2000 may include a user interface to receive pre-operative input data from a user. The graphical display 2000 includes an illustration of a bone 2005 to be corrected, which is a left tibia in the present example as well as the anticipated post-operation, post-prescription bone 2050. In the present example, the bones 2005 and 2050 also include a representation of an orthopedic device, which is an external fixator in the present example.

In many examples, the images may include radiological images uploaded by the user for the bone 2005 such a 3D image or AP and LAT images. In such examples, transosseous logic circuitry may determine an approximate placement of the orthopedic device based on image processing and markers in the radiological images to identify the location of the bone boundaries on the bone. In other examples, the approximate location of the orthopedic device may be input by the user and/or may be based on user inputs for the bone boundaries. In still other examples, the graphical display may illustrate the bone 2005 without an orthopedic device for the purposes of gathering pre-OP input data from the user.

The user inputs may also include, for example, a proximal bone boundary 2020, a reference ring location 2010 (proximal ring location), an intermediate bone boundary 2030 (e.g., at the apex of the deformity to be corrected), a distal bone boundary 2040, and a final frame height such as a neutral frame height 2060. Note that each of the boundaries and locations may include a distance from a reference location for each 2D image such an AP image or a LAT image or may include an AP translation and a LAT translation tuple for a 3D image. Furthermore, each of the boundaries may include an angle for each of the 2D images such as AP angulation and a LAT angulation or may include an AP angulation and a LAT angulation tuple for a 3D image. Note that the images are not required to be AP and LAT but can be any two different views and the coordinates may be translated or converted based on one or more markers in the images to identify common points on the images. Note also that when the user provides inputs for the boundaries and locations in 2D images graphically or via key entry, the transosseous logic circuitry may resolve minor conflicts in input data between the two images automatically and/or by presenting a proposed solution to a conflict to the user so the user can verify or provide a resolution to such conflicting input data.

The pre-OP input data includes the proximal bone boundary 2020 shown here as a medial proximal tibia angle (MTBA) and level. In some examples, the proximal bone boundary 2020 may be set by the image(s) at a zero degree angle and at a reference level such as zero mm. In other examples, the image(s) may include the proximal bone boundary at a non-zero angle and the image(s) may include a non-zero level for the proximal bone boundary 2020. In some examples, the user may graphically input the proximal bone boundary on each of two 2D images by drawing a line at the proximal bone boundary. On a 3D image, the user may draw a plane at the proximal bone boundary or provide at least three points on a plane of the proximal bone boundary. In some examples, the user may also or alternatively provide measurements via a keyboard or select and/or adjust a measurement estimated by the transosseous logic circuitry based on image processing.

The pre-OP input data includes the reference ring location 2010. The reference ring location 2010 may include a proximal ring location and may be located between the proximal bone boundary 2020 and an apex of deformity in the bone 2005 shown as the intermediate bone boundary 2030. In some examples, the transosseous logic circuitry may suggest a reference ring location 2010 based on image processing to identify the apex of the deformity and may present a proposed reference ring location to the user for approval and/or adjustment. In further examples, the transosseous logic circuitry may estimate a reference ring location in the 2D images or 3D image based on input of a point by the user indicative of the AP and LAT distances or coordinates of the reference ring location 2010 by estimating AP and LAT angulation based on the AP and LAT angulation of the proximal bone boundary 2020. In further examples, the transosseous logic circuitry may determine a reference ring location 2010 based an input of a line (graphically or by entry of coordinates) on one or both 2D images or by entry of at least two points of the plane of the reference ring location 2010 on a 3D image.

The pre-OP input data includes the intermediate bone boundary 2030. The intermediate bone boundary 2030 may include user input data about the location of the apex of deformity of the bone 2005. In some examples, user may graphically or by key entry of coordinates, identify a line through the apex of deformity on 2D images or a identify a plane through the apex of deformity on a 3D image. In the present example, which illustrates an AP image, the user may input the apex of deformity as a line through the apex at 15 degrees valgus. If the deformity is not evident in the LAT image (indicating a zero degree valgus or varus), the apex of deformity may be represented as a tuple (15, 0) to indicate a positive 15 degree valgus AP angulation and a 0 degree valgus (or varus) LAT angulation at plane identified by the user with a line through the apex of deformity. In such examples, the user may input a line on the AP image and a point at the apex on the LAT image to identify a plane through the apex of deformity.

For situations in which the bone 2005 has a deformity in the AP image and the LAT image, the user may input, graphically or via key entry, a line on the AP image to indicate a non-zero AP angulation and a line on the LAT image to indicate a non-zero LAT angulation to create an AP/LAT angulation tuple as well as an AP/LAT distance tuple. In such examples, the apex of deformity may lie along the plane identified by user input of the lines in the AP image and the LAT image. In other examples, the user may provide at least three dots to indicate a plane of the apex of deformity on a 3D image.

The pre-OP input data includes the distal bone boundary 2040. The distal bone boundary 2030 may include user input data about the location of the distal end of the bone 2005 on each of the 2D images or on the 3D image. In some examples, the user may enter the level and position of the distal bone boundary by graphically indicating lines on each of the 2D images or by graphically indicating a plane on a 3D image. In many examples, the user may alternatively identify the distal bone boundary 2040 by providing an AP distance, a LAT distance, an AP angulation, and a LAT angulation graphically or by key entry. In several examples, the user may identify the distal bone boundary 2040 by indicating, graphically and/or by key entry, and a plane representative of the distal bone boundary 2040. Note that many examples provide one or more of the methods discussed herein for providing positions and levels of boundaries for two 2D images or for a 3D image and the user may select the method for identifying the boundary or location based on the user's preference.

In many examples, the transosseous logic circuitry may gather additional pre-operative user input from the user, from default settings, or from user preference settings (user preferences), and/or the like. The additional pre-operative user input data may include information about the number and type of transosseous elements per ring for the orthopedic device and whether or not to include a proximal and/or distal ring block.

Note that, in many examples, the user may include a preference to automatically assume one or more user preferences or default settings, which may be filed in a preference data structure in a data storage medium (e.g., hard drive or solid-state drive) on an HCP device for the user such as the HCP device 140 in FIG. 1. In other examples, the user preferences and/or default preferences may reside on a server such as the server 130 in FIG. 1. In such examples, the transosseous logic circuitry may select user preferences where provided and/or default preferences where corresponding user preferences are not available, to present proposed values for each of the user input data to the user. The user may accept each of the proposed values, accept all the proposed values, or adjust one or more of the proposed values prior to generation of an automated output of the transosseous elements and other fixations for an orthopedic device to correct a bone deformity in the bone 2005.

In many examples, the user may adjust all the input data and preferences before and/or after generation of an automated output of the one or more of the proposed values prior to generation of an automated output of the transosseous elements and other fixations for an orthopedic device to correct a bone deformity in the bone 2005. In many examples, the user may have the option or the transosseous logic circuitry may automatically revise the automated output based on changes or adjustments made by the user including changes to the uploaded 2D or 3D image files.

Figure 2B:
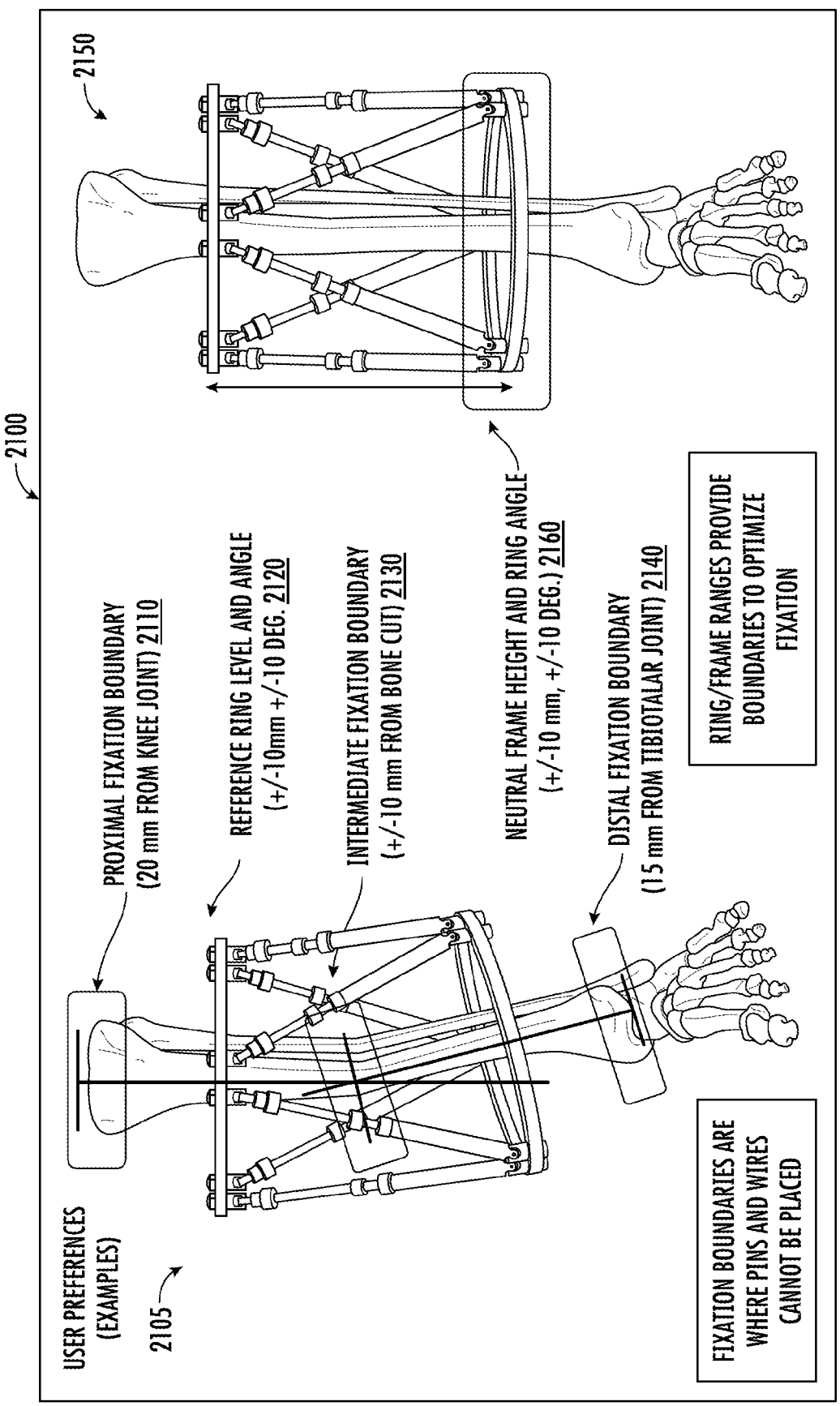
FIG. 2B illustrates a graphical display for user preferences in accordance with examples such as the system in FIG. 1.

FIG. 2B illustrates a graphical display 2100 generated by transosseous logic circuitry for user preference input data in accordance with examples such as the system in FIG. 1. The graphical display 2100 may include a pre-operative (pre-OP) bone 2105 (bone to be corrected) and the post-prescription bone 2150 (after correction). In many examples, the graphical display 2100 may include an orthopedic device on the pre-operative bone 2105 and the post-prescription bone 2150. In other examples, the graphical display 2100 may not show the orthopedic device, may show the orthopedic device on the post-prescription bone 2150, or may show the orthopedic device on the pre-operative bone 2105.

The user preferences may relate to the type of orthopedic device and/or the anatomy of the pre-operative bone 2105. In some examples, the transosseous logic circuitry may extract the anatomy including the bone identification and an indication about the location of the deformity from one or more image files uploaded by the user such as 2D AP/LAT images or a 3D image. In the present example, the image file filename or metadata associated with one of the images may identify the bone as a left tibia and may identify the deformity as a mid-shaft deformity.

The user preferences may include a proximal fixation boundary 2110, a reference ring level and position 2120, an intermediate fixation boundary 2130, a distal fixation boundary 2140, and a neutral frame height and ring angle 2160. The proximal fixation boundary 2110 may identify a volume about the proximal bone boundary 2020 within which the user prefers not to attach transosseous elements to the bone. For example, the user may set a preference to avoid fixation within 20 mm of the knee joint at the proximal bone boundary 2020. As such the proximal fixation boundary 2110 may be set to 20 mm from the knee joint (the proximal bone boundary 2020). In other examples, the user may set a proximal fixation boundary 2110 of 10 mm, 15 mm, or 25 mm. In still other examples, the proximal fixation boundary 2110 may include a percentage of the overall length of the pre-OP bone 2105. In further examples, the user may identify the boundary graphically and/or via key entry.

The reference ring level and position 2120 may identify acceptable variations for locating the reference ring about the reference ring location 2010 to provide flexibility in the location of the proximal ring to meet other requirements or to modify the location based on circumstances related to a particular pre-OP bone 2105 deformity. In the present example, the user sets the reference ring level and position 2120 to +/−10 mm and +/−10 degrees. In some examples, the user may set the reference ring level and position 2120 for each of the 2D images (e.g., AP and LAT) or for the 3D image. In other examples, the user may set the reference ring level and position 2120 of, e.g., +/−10 mm and +/−10 degrees to apply to both the AP image and the LAT image or for the 3D image. In still other examples, the user may select different dimensions for the AP image than for the LAT image such as +/−10 mm and +/−10 degrees for the AP image and +/−12 mm and +/−12 degrees for the LAT image. Such differences may be based on a particular pre-OP bone 2105 deformity.

The intermediate fixation boundary 2130 may identify a volume about the intermediate bone boundary 2030 within which the user prefers not to attach transosseous elements to the bone. For example, the user may set a preference to avoid fixation within +/−10 mm of the corticotomy site (bone cut at the apex of the deformity) about the intermediate bone boundary 2130. For instance, the user may consider attachment of a transosseous element within 10 mm of the bone cut to cause too high of a risk of butterflying or bone crack propagation. Other users may prefer, e.g., anywhere from 10 mm to 15 mm to be too close to the bone cut. Again, such preferences may depend on the particular bone 2105 but the user may include a user preference as a general rule and may adjust the preference as needed for the particular bone 2105.

In many examples, the user may provide the intermediate fixation boundary graphically or by key entry and may do so by any method discussed herein for each of the 2D images or for the 3D image of the pre-OP bone 2105.

The distal fixation boundary 2140 may include a volume of bone within which the user prefers not to attach transosseous elements. For instance, the user may set a user preference to avoid fixation within 15 mm of the distal bone boundary 2040 shown in FIG. 2A, which is the bone within 15 mm of the ankle joint. The user may indicate the 15 mm by indicating (e.g., drawing) a line or selecting two or more two or more points along a line in each of the 2D images of the pre-OP bone 2105. In other examples, the user may select a different distance from the distal bone boundary 2040 such as, 10 mm or 20 mm. In many examples, the user may adjust the boundary prior to or after an automated output of the locations for the transosseous elements based on features of the particular pre-OP bone 2105 being corrected.

The neutral frame height and ring angle 2160 may describe flexibility in the level and position of the distal ring of the orthopedic device to allow the transosseous logic circuitry to optimize various transosseous element levels and positions with available fixations as well as avoid impingement of any portions of the structure of the orthopedic device such as the struts, rings, and transosseous elements with each other during correction of the pre-OP bone 2105. The correction of the pre-OP bone 2105 involves AP and LAT translations and angulations to move the distal ring to the neutral frame height and angle 2160. The user may describe the neutral frame height and angle 2160 by any method discussed herein on the 2D images or the 3D image such as by indicating, e.g., +/−10 mm and +/−10 degrees graphically through dragging an existing or proposed locations limits or by key entry of the limits. In some examples, the user may choose to include different plus and minus values as well as different values for the distance and angle values. For instance, the user may indicate a +10 mm variation and a −12 mm variation. Similarly, the user may indicate a +12 degree variation and a −9 degree variation based on features of the particular bone 2105. As with the other user input data, the user may adjust each of the values before or after automated determination of the levels and positions for transosseous elements to couple an orthopedic device with the bone segments of the bone 2105 after implementation of the bone cut.

Figure 2C:
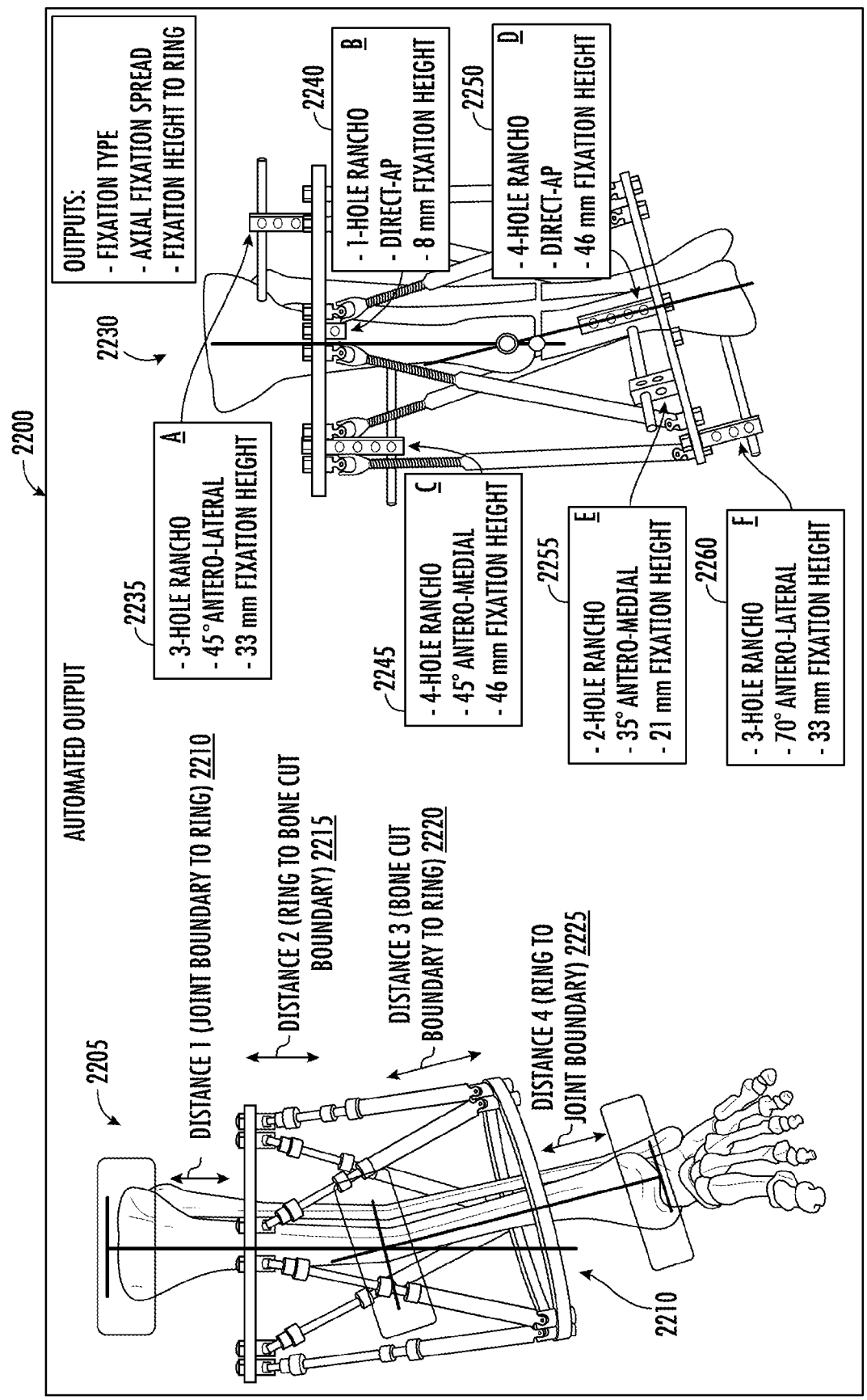
FIG. 2C illustrates a graphical display for automated outputs in accordance with examples such as the system in FIG. 1.

FIG. 2C illustrates a graphical display 2200 for automated outputs in accordance with examples such as the system in FIG. 1. The transosseous logic circuitry may create the graphical display 2200) to present the automated output to the user. The graphical display 2200 may include a depiction of the pre-OP bone 2205 with, e.g., four distances to define the alignment of the orthopedic device with respect to a proximal bone segment of the pre-OP bone 2205, which is the portion of the bone 22045 from the proximal bone boundary 2020 to the intermediate bone boundary 2030 and with respect to a distal bone segment between the intermediate bone boundary 2030 and the distal bone boundary 2040 as shown in FIG. 2A.

The distance 1 2210 is the distance between the joint boundary (proximal bone boundary 2020) and the reference ring location 2010 (the proximal ring location). The distance 2 2215 is the distance between the reference ring location 2010 and intermediate bone boundary 2030 (the corticotomy site). The distance 3 is the distance between the intermediate bone boundary 2030 and the distal ring location 2210. And the distance 4 2225 is the distance between the distal ring location 2210 and the joint boundary (distal bone boundary 2040).

The display 2200 may also include the post-OP bone 2230. The post-OP bone is the pre-OP bone 2205 after the bone cut at the intermediate bone boundary 2030. The graphically display 2200 may show the post-OP bone 2230 at an initial post-OP state prior to implementation of a prescription for the orthopedic device to correct the pre-OP bone 2205.

The post-OP bone 2230 may include the orthopedic device along with the transosseous elements such as pins and wires as well as fixations such as one or more 1 hole Ranchos, 2 hole Ranchos, 3 hole Ranchos, and 4 hole Ranchos. Fixation A 2235 through fixation F 2260 illustrate fixation types, axial fixation spread, and fixation height to the ring with which the fixation is coupled.

The fixation A 2235 through fixation C 2245 describe three fixations attached to the proximal ring 2010. The automated output includes three pins in response to the user preference setting of three pins per ring for the orthopedic device. Other users may select a different number or types of transosseous elements per ring such as 4 pins or 3 pins and 2 wires or 2 pins and 4 wires, and/or the like.

The fixation A 2235 illustrates and describes a fixation type including a 3 hole Rancho mounted to the proximal ring to support a 45 degree antero-lateral pin (e.g., 10 o'clock) at a fixation height of 33 mm above the proximal ring. The fixation B 2240 illustrates and describes a fixation type including a 1 hole Rancho mounted to the proximal ring to support a direct anteroposterior pin (e.g., 12 o'clock) at a fixation height of 8 mm below the proximal ring. The fixation C 2245 illustrates and describes a fixation type including a 4 hole Rancho mounted to the proximal ring to support a 45 degree anteromedial pin (e.g., 2 o'clock) at a fixation height of 8 mm below the proximal ring.

The fixation D 2250 through fixation F 2260 describe three fixations attached to the distal ring 2210. The fixation D 2250 illustrates and describes a fixation type including a 4 hole Rancho mounted to the distal ring 2210) to support a direct anteroposterior pin (e.g., 12 o'clock) at a fixation height of 46 mm above the distal ring. The fixation E 2255 illustrates and describes a fixation type including a 2 hole Rancho mounted to the distal ring 2210 to support a 35 degree anteromedial pin (e.g., 1 o'clock) at a fixation height of 21 mm above the distal ring. The fixation F 2260 illustrates and describes a fixation type including a 3 hole Rancho mounted to the distal ring 2210 to support a 70 degree anteromedial pin (e.g., 1 o'clock) at a fixation height of 33 mm below the distal ring.

After displaying the graphical display 2200 of the automated output, the transosseous logic circuitry may allow the user to adjust the distances, angles, fixation types, and fixation heights. For instance, the user may select the 1 hole Rancho at fixation B 2240 and change the fixation type to a 2 hole Rancho with a mount height for the pin at 21 mm below the proximal ring. In some examples, the transosseous logic circuitry may automatically perform an impingement analysis to determine if the change would cause an impingement. If the change does not cause an impingement and does not violate any preferences, the transosseous logic circuitry may indicate that the change does not cause an impingement and does not violate any preferences by, e.g., shading the change with a green color or changing the adjusted fixation with a green color font. If the change does not cause an impingement and but does violate at least one of the preferences, the transosseous logic circuitry may indicate that the change does not cause an impingement and but does violate at least one of the preferences by, e.g., shading the change with a yellow color or changing the adjusted fixation with a yellow color font. In some examples, the transosseous logic circuitry may also display a list of the one or more preferences that are violated by the user changes.

If the change does cause an impingement, the transosseous logic circuitry may indicate that the change does cause an impingement by, e.g., shading the change with a red color or changing the adjusted fixation with a red color font. In some examples, the transosseous logic circuitry may also display a list of the impinging structures such as strut 6 and pin at fixation B as well one or more preferences that are violated, if applicable, by the user changes.

Figure 2D:
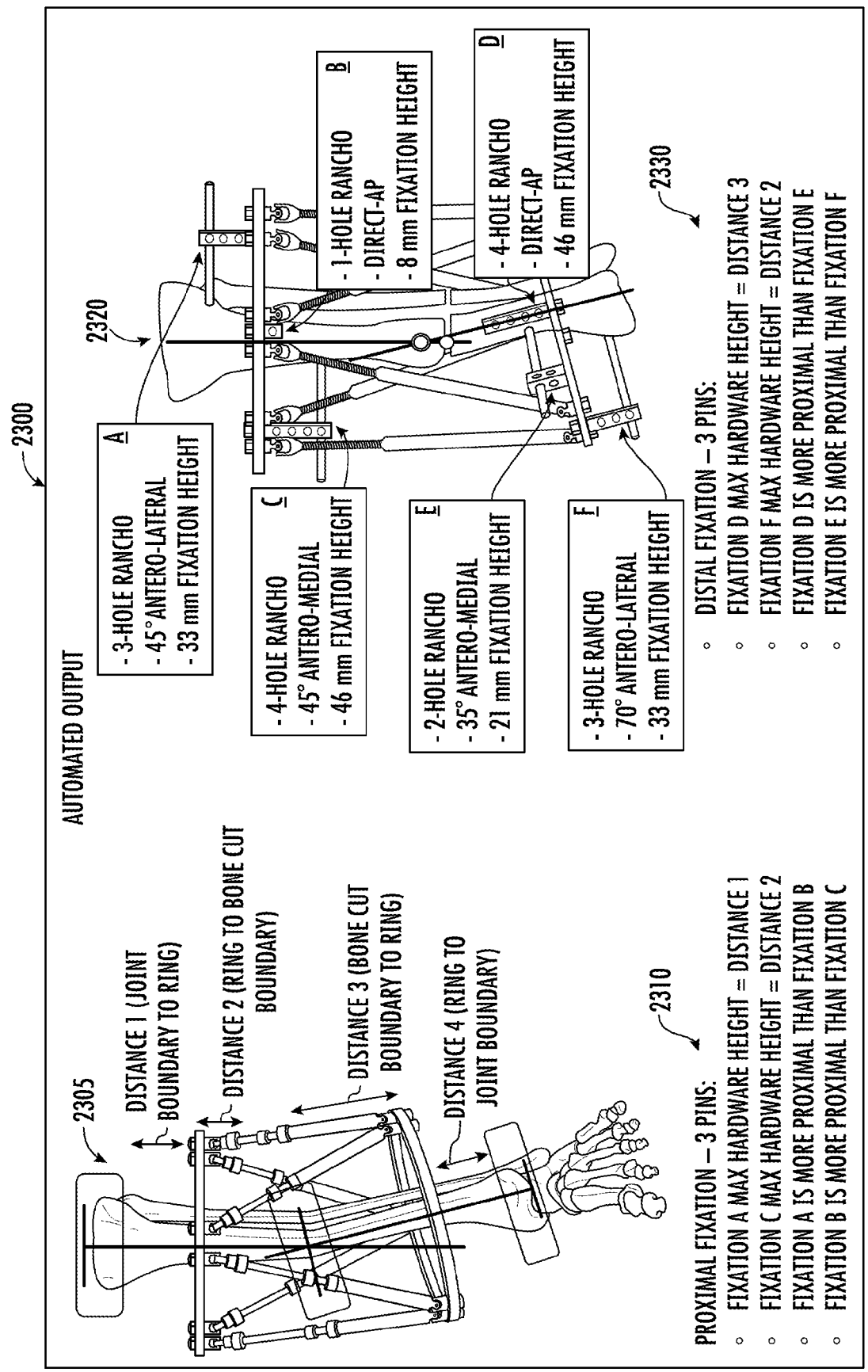
FIG. 2D illustrates a graphical display for an example of determinations for automated outputs in accordance with examples such as the system in FIG. 1.

FIG. 2D illustrates a graphical display 2300 for an example of determinations for automated outputs in accordance with examples such as the system in FIG. 1. The graphical display 2300 may add a list of the three pins for coupled with the proximal ring, proximal fixation 2310, and the three pins coupled with the distal ring, distal fixation 2330. The lists may describe the boundaries for locating the three pins on the proximal ring and the three pins on the distal ring. For example, at the proximal fixation 2310, the fixation A may have a maximum height equal to distance 1; the fixation C may have a maximum height equal to distance 2; the fixation A may be more proximal to fixation B; and the fixation B may be more proximal to fixation C.

At the distal fixation 2330, the fixation D may have a maximum height equal to distance 3; the fixation F may have a maximum height equal to distance 4; the fixation D may be more proximal to fixation E, and the fixation E may be more proximal to fixation F.

Figure 2E:
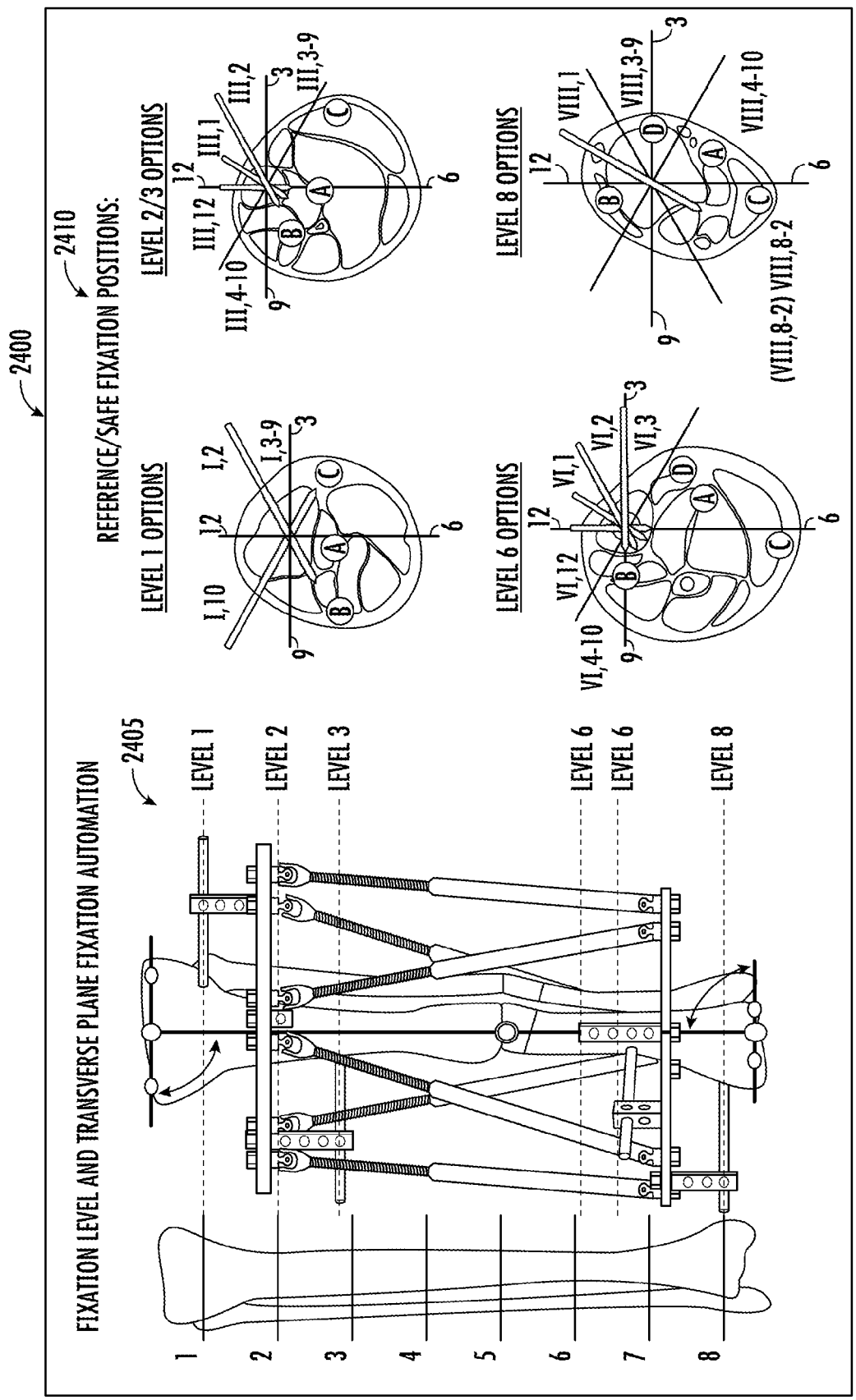
FIG. 2E illustrates a graphical display for reference (or safe) levels and positions for transosseous elements in accordance with examples such as the system in FIG. 1.

FIG. 2E illustrates a graphical display 2400 for reference (or safe) levels and positions for transosseous elements in accordance with examples such as the system in FIG. 1 and the external fixator in FIGS. 2A-2D. In many examples, the transosseous logic circuitry may display the reference fixation levels 2405 and reference fixation positions 2410 as a reference for the user. These reference fixation levels 2405 and reference fixation positions 2410 are also referred to as "safe" because these reference fixation levels 2405 and reference fixation positions 2410 identify the levels and positions at which transosseous elements may be inserted into a bone that will avoid or minimize the impact or damage of structures proximate to the bone such as major arteries, major veins, neurovascular bundles, and/or the like. Avoiding neurovascular bundles may not only, advantageously, reduce or minimize the chance of causing nerve damage but may also, advantageously, reduce or minimize discomfort of the patient. Other examples may not present the graphical display 2400.

The reference fixation levels 2405 may include a bone illustration with several levels such as 8 or 12. Each of the levels that include a reference fixation position may be represented by a cross-section of the bone illustrating soft tissue and neurovascular bundles at the level as well as positions for connection to the bone listed as 12 hour analog clock times. Note that the pins are shown as thicker lines than the wires, the wires cross through the cortex of the bone and out the soft tissue, and the pins are installed in the cortex of the bones. For instance, at level 1, the reference options include a pin at 10 o'clock, a pin at 2 o'clock and a wire from 3 o'clock to 9 o'clock. The levels 2 and 3 reference options include a wire from 4 to 10 o'clock, a pin at 12 o'clock, a pin at 1 o'clock, a pin at 2 o'clock, and a wire from 3 to 9 o'clock. The level 6 reference options include a wire from 4 to 10 o'clock, a pin at 12 o'clock, a pin at 1 o'clock, a pin at 2 o'clock, a wire from 3 to 9 o'clock, and a pin at 3 o'clock. And the level 8 reference options include a pin at 1 o'clock, a wire from 3 to 9 o'clock, a wire from 4 to 10 o'clock, and a wire from 8 to 2 o'clock.

Figure 2F:
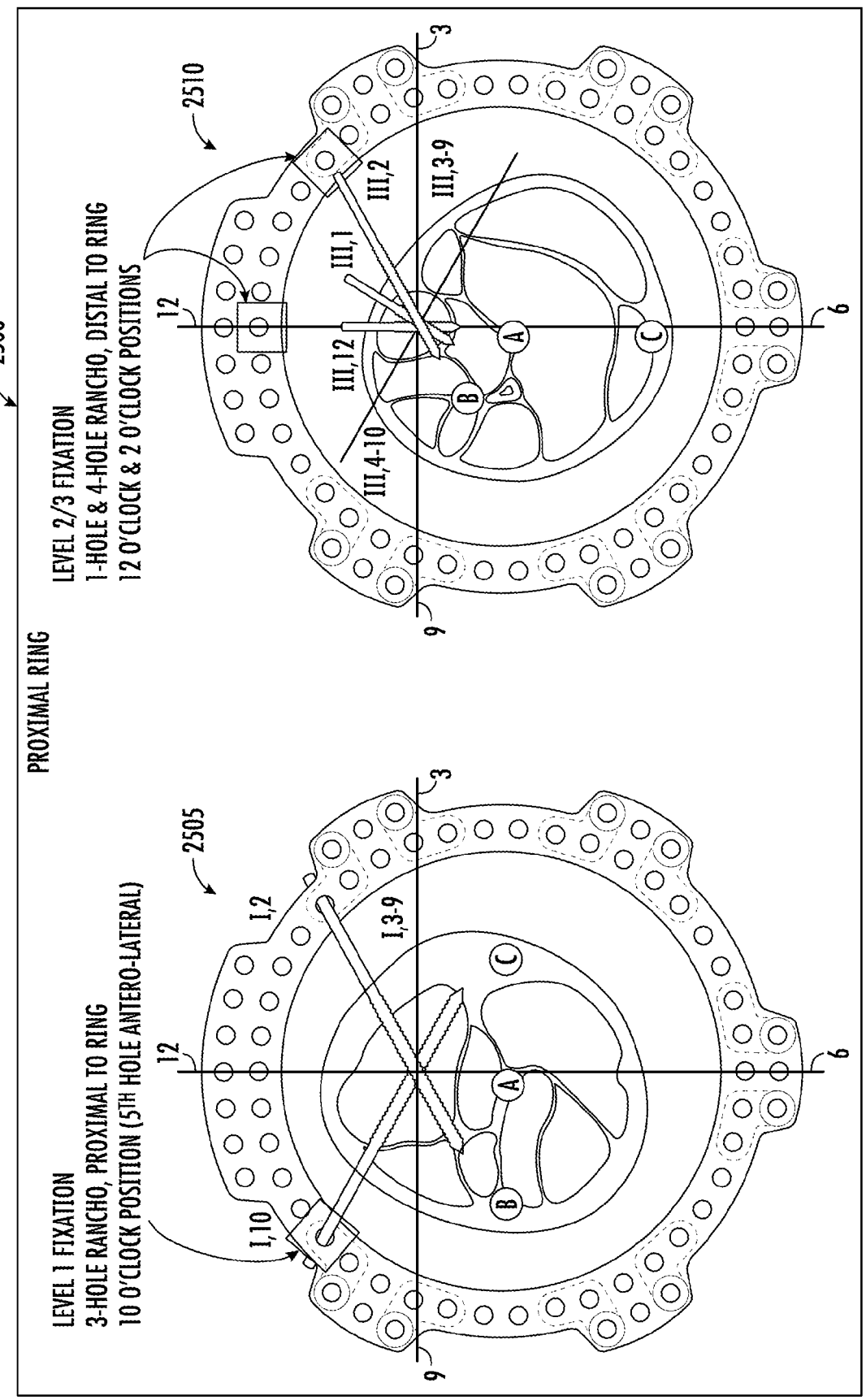
FIG. 2F illustrates a graphical display for selected reference (or safe) positions for a proximal ring in accordance with examples such as the system in FIG. 1.

FIG. 2F illustrates a graphical display 2500 for selected reference positions for a proximal ring in accordance with examples such as the system in FIG. 1 and the automated output in FIGS. 2C-D. The level 1 fixation 2505 shows the hole location on the ring to attach the 3 hole Rancho of fixation A in the automated output of FIG. 2C. The display also superimposes the cross-section of the bone to show the angle of the pin to couple with the level 1 fixation.

The level 2/3 fixation 2510 shows the hole locations on the proximal ring to attach the 1 hole and 4 hole Ranchos of fixations B and C, respectively, in the automated output of FIG. 2C. The display also superimposes the cross-section of the bone to show the angles of the pins to couple with the level 2/3 fixation 2510.

Figure 2G:
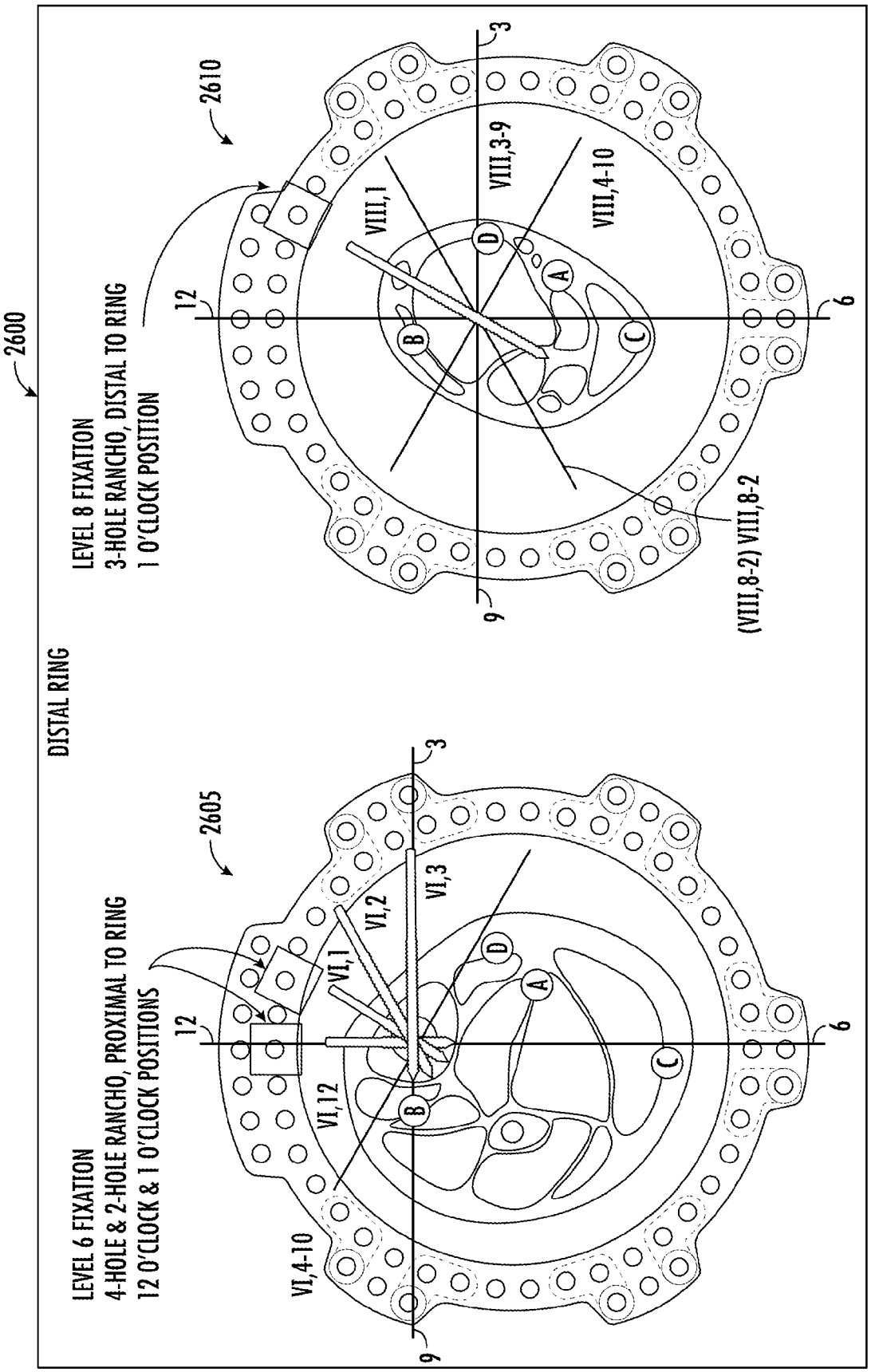
FIG. 2G illustrates a graphical display for selected reference (or safe) positions for a distal ring in accordance with examples such as the system in FIG. 1.

FIG. 2G illustrates a graphical display 2600 for selected reference positions for a distal ring in accordance with examples such as the system in FIG. 1 and the automated output in FIGS. 2C-D. The level 6 fixation 2605 shows the hole locations on the distal ring to attach the 4 hole and 2 hole Ranchos of fixations C and D, respectively, in the automated output of FIG. 2C. The display also superimposes the cross-section of the bone to show the angle of the pin to couple with the level 1 fixation.

The level 8 fixation 2610 shows the hole location on the distal ring to attach the 3 hole Rancho of fixation F in the automated output of FIG. 2C. The display also superimposes the cross-section of the bone to show the angles of the pins to couple with the level 8 fixation 2610.

Figure 2H:
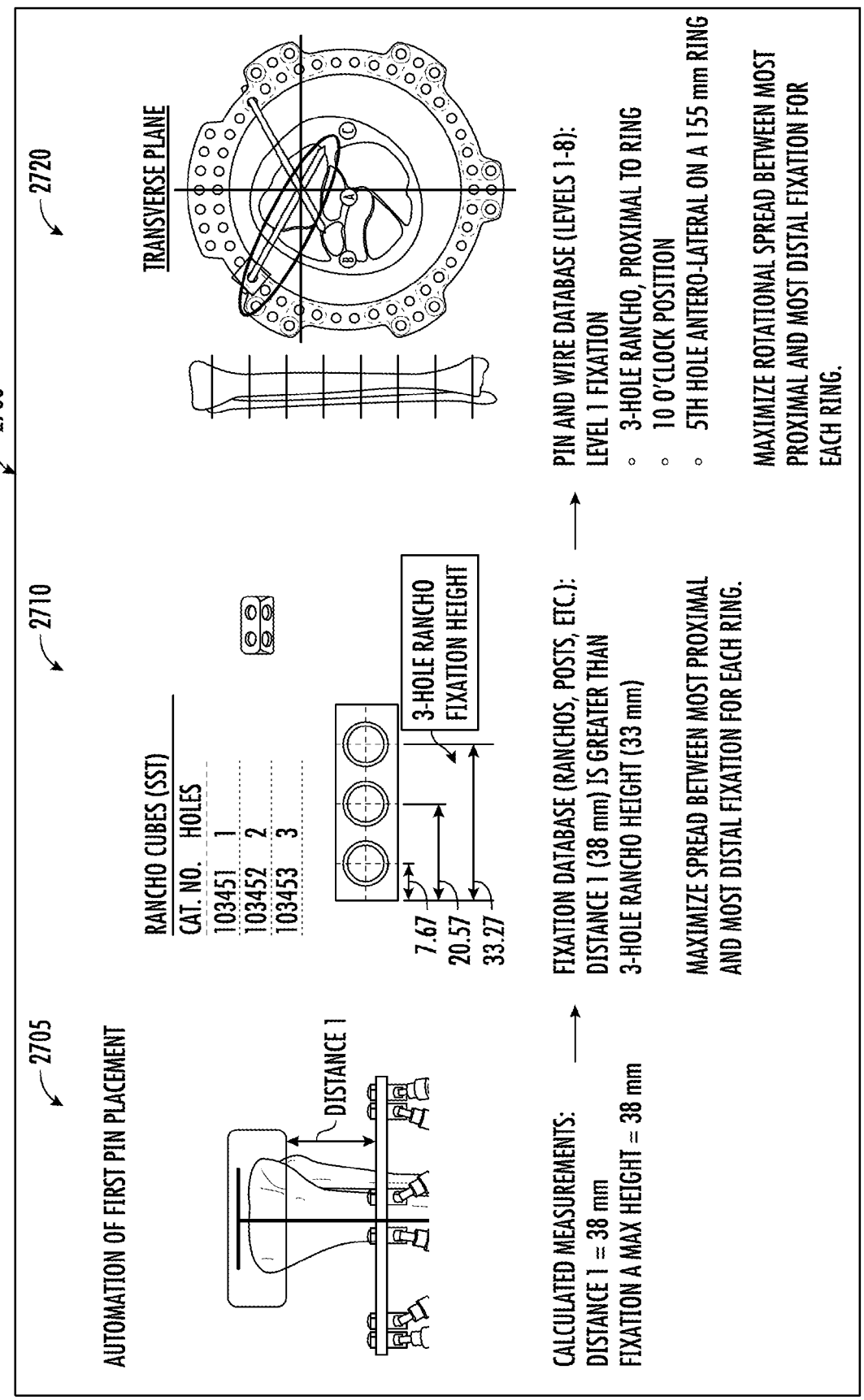
FIG. 2H illustrates a graphical display for automated output for a level and position of a first pin in accordance with examples such as the system in FIG. 1.

FIG. 2H illustrates a graphical display 2700 for automated output for a level and position of a first pin in accordance with examples such as the system in FIG. 1. The graphical display 2700 includes three steps for determining the height of the first pin at fixation A shown in FIG. 2C. In some examples, the transosseous logic circuitry may calculate the distance 1 2210) as being 38 mm and may set the maximum height for the first pin as 38 mm. Thereafter, at illustration 2710, the transosseous logic circuitry may access a data structure such as a database that contains available fixations for attachment to the external fixator as well as the dimensions of the fixations. With the maximum height of 38 mm, the transosseous logic circuitry may choose the 3 hole Rancho with the pin support at 33.27 mm since 33.27 mm is less than 38 mm and 46 mm (the distance to the fourth hole of a 4 hole Rancho is greater than 38 mm. The transosseous logic circuitry may choose the fixation size (Rancho size) to maximize the spread between the most proximal and the most distal fixation for each ring.

Thereafter, at illustration 2720, the transosseous logic circuitry may identify a reference pin angle at level 1 to insert the pin into the bone 2230. In this example, the transosseous logic circuitry may choose the 10 o'clock angle for the pin. The transosseous logic circuitry may select the 10 o'clock position to maximize the rotational spread between the most proximal and the most distal fixation for each ring. Note that transosseous logic circuitry chose the 2 o'clock pin position for fixation C in FIG. 2C.

Figure 2I:
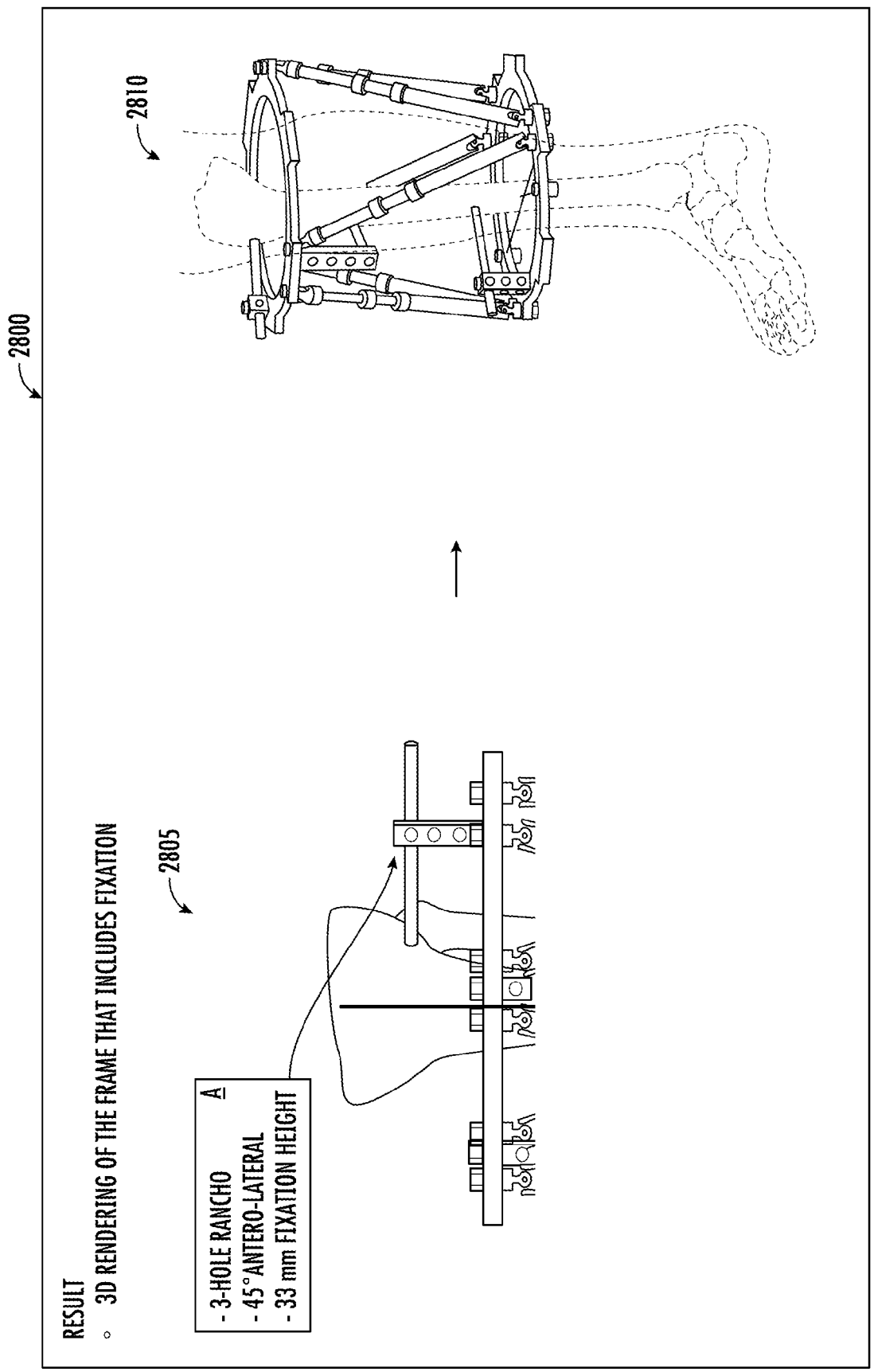
FIG. 2I illustrates a graphical display of a rendering of the level and position of the first pin postoperative (post-OP) in accordance with examples such as the system in FIG. 1.

FIG. 2I illustrates a graphical display 2800 of a rendering of the level and position of the first pin post-OP on the bone 2805 and on a rendering of the bone with an overlay of the soft tissue 2810 after correction of the bone 2805 in accordance with examples such as the system in FIG. 1 and the automated output shown in FIGS. 2C-2H.

Figure 2J:
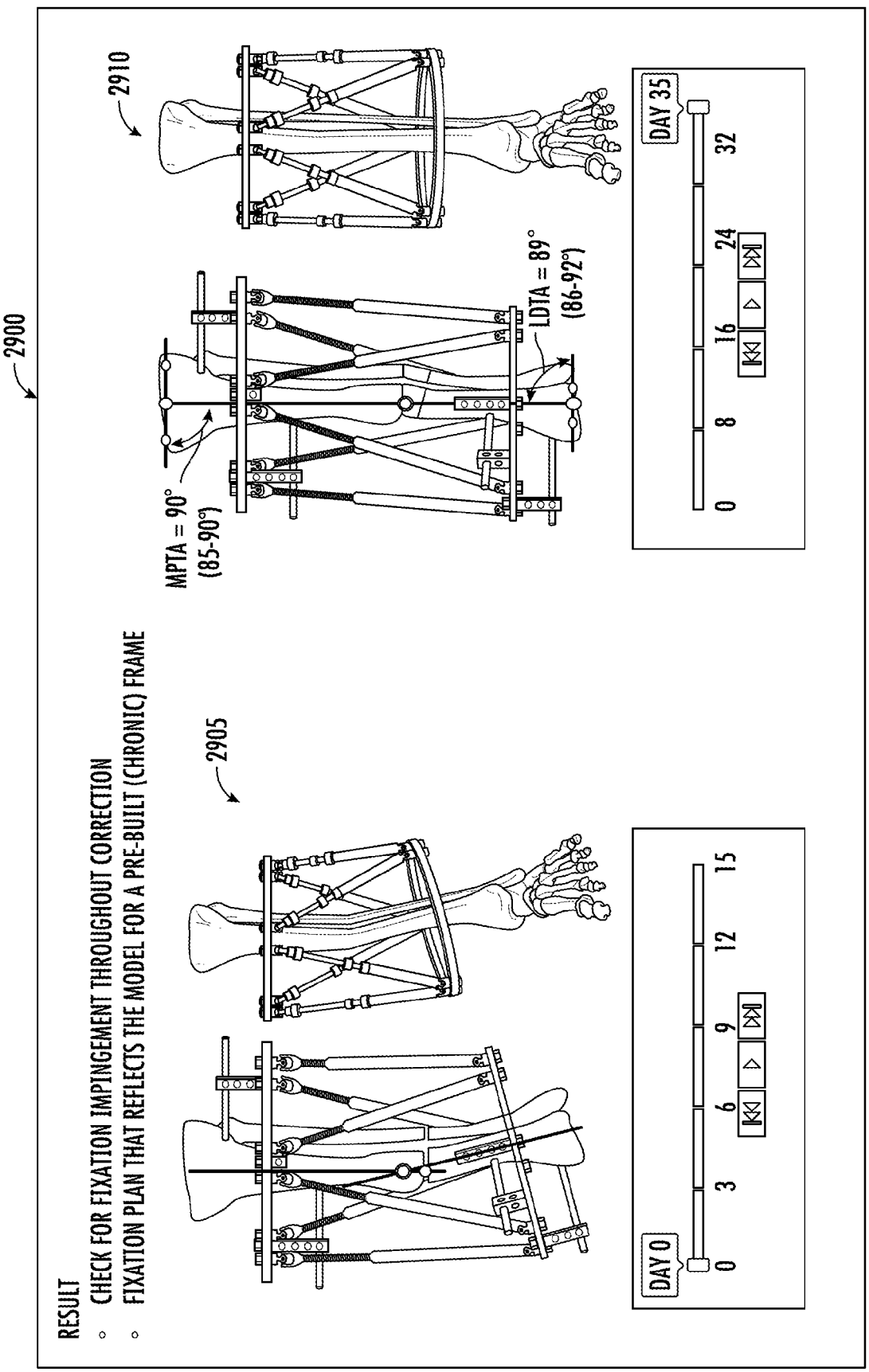
FIG. 2J illustrates a graphical display of a rendering of the level and position of transosseous elements post-OP and post-prescription in accordance with examples such as the system in FIG. 1.

FIG. 2J illustrates a graphical display 2900 of a rendering of the level and position of transosseous elements post-OP 2905 (day 0 of prescription) and post-prescription 2910 (e.g., day 35 of the prescription) in accordance with examples such as the system in FIG. 1. Note that the transosseous logic circuitry may operate in conjunction of a prescription generation software package to use during impingement analyses. In other examples, the transosseous logic circuitry may generate a prescription to perform impingement analyses based on movements to arrange the distal ring from an initial location on pre-OP bone 2005 to a neutral frame height 2050 and angle.

Figure 3:
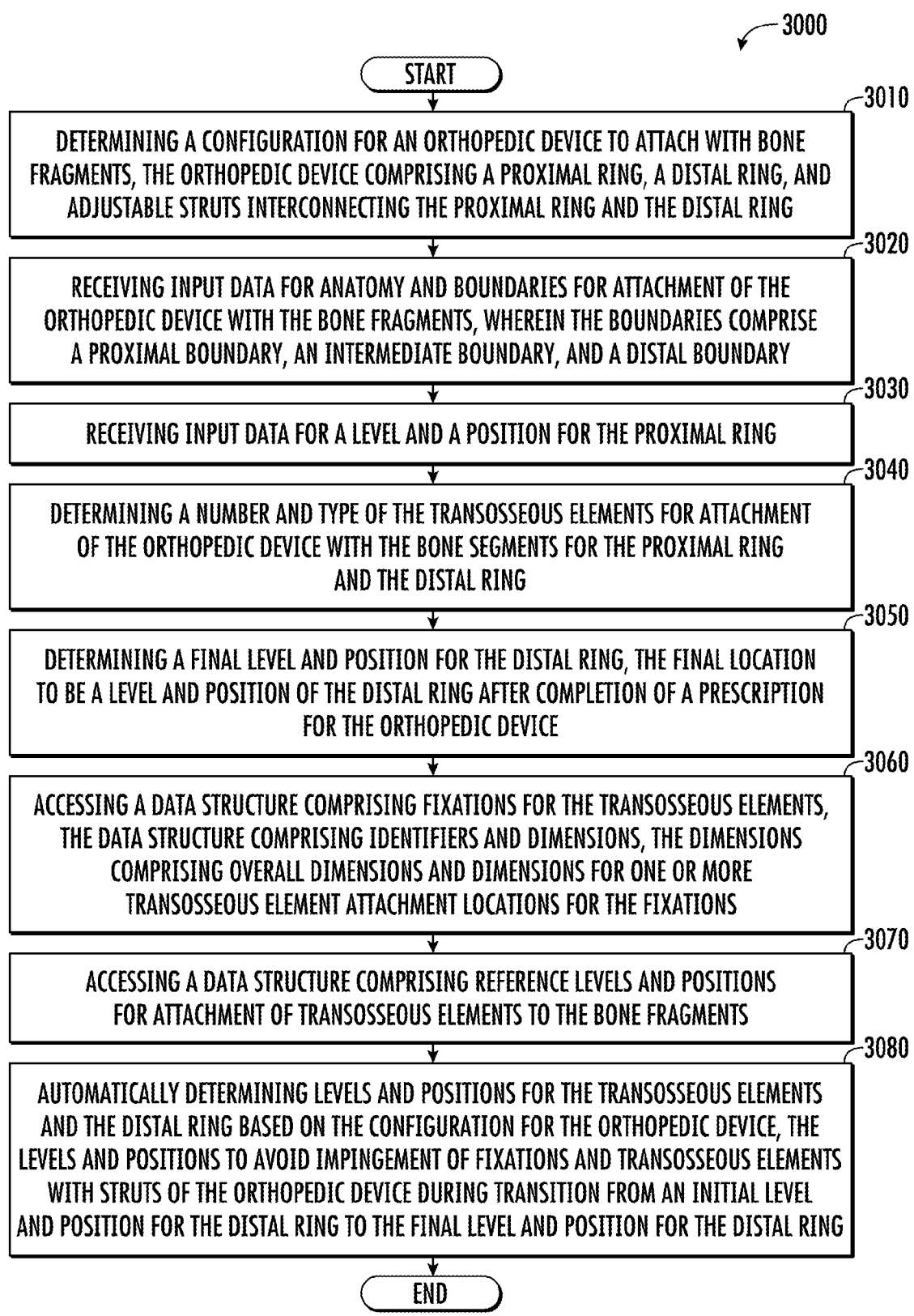
FIG. 3 illustrates a perspective view of an example of a motorized spatial frame including an integrated control unit and power supply in accordance with examples such as the system in FIG. 1.

FIG. 3 depicts a flowchart 3000 of examples to automatically determine levels and positions for transosseous elements. The flowchart 3000 may determine a configuration for an orthopedic device to attach with bone segments (element 3010). The orthopedic device may include a proximal ring, a distal ring, and adjustable struts interconnecting the proximal ring and the distal ring.

The transosseous logic circuitry may receive input data for anatomy and boundaries for attachment of the orthopedic device with the bone segments (element 3020). The boundaries may include a proximal boundary, an intermediate boundary, and a distal boundary. In some examples, the transosseous logic circuitry may provide a user with a filtered list of orthopedic devices based on an indication of a bone to which the orthopedic device will be installed.

The transosseous logic circuitry may receive input data for a level and a position for the proximal ring (element 3030) and determine a number and type of the transosseous elements for attachment of the orthopedic device with the bone segments of the bone to be corrected (after corticotomy) for the proximal ring and the distal ring (element 3040). In many examples, the transosseous logic circuitry may access memory containing user preferences and default settings for associated with the orthopedic device to determine the number and type of transosseous elements. In several examples, the number and type of transosseous elements may be presented to the user for confirmation or adjustment prior to automating the determination of the levels and positions for the transosseous elements.

The transosseous logic circuitry may determine a final level and position for the distal ring (element 3050). The final level and position for the distal ring may be a level and position of the distal ring after completion of a prescription for the orthopedic device.

In many examples, the transosseous logic circuitry may access a data structure including fixations for the transosseous elements (element 3060). The data structure may include identifiers and dimensions. The identifiers may uniquely identify each of the fixations within the data structure. The dimensions may include overall dimensions for each fixation as well as specific dimensions for one or more transosseous element attachment levels and positions for each of the fixations.

The transosseous logic circuitry may access a data structure including reference levels and positions for attachment of transosseous elements to the bone fragments (element 3060). Thereafter, the transosseous logic circuitry may automatically determine levels and positions for the transosseous elements and the distal ring based on the configuration for the orthopedic device. The levels and positions may avoid impingement of fixations including transosseous elements with struts of the orthopedic device during transition throughout the correction path) from an initial level and position for the distal ring to the final level and position for the distal ring.

Figure 4:
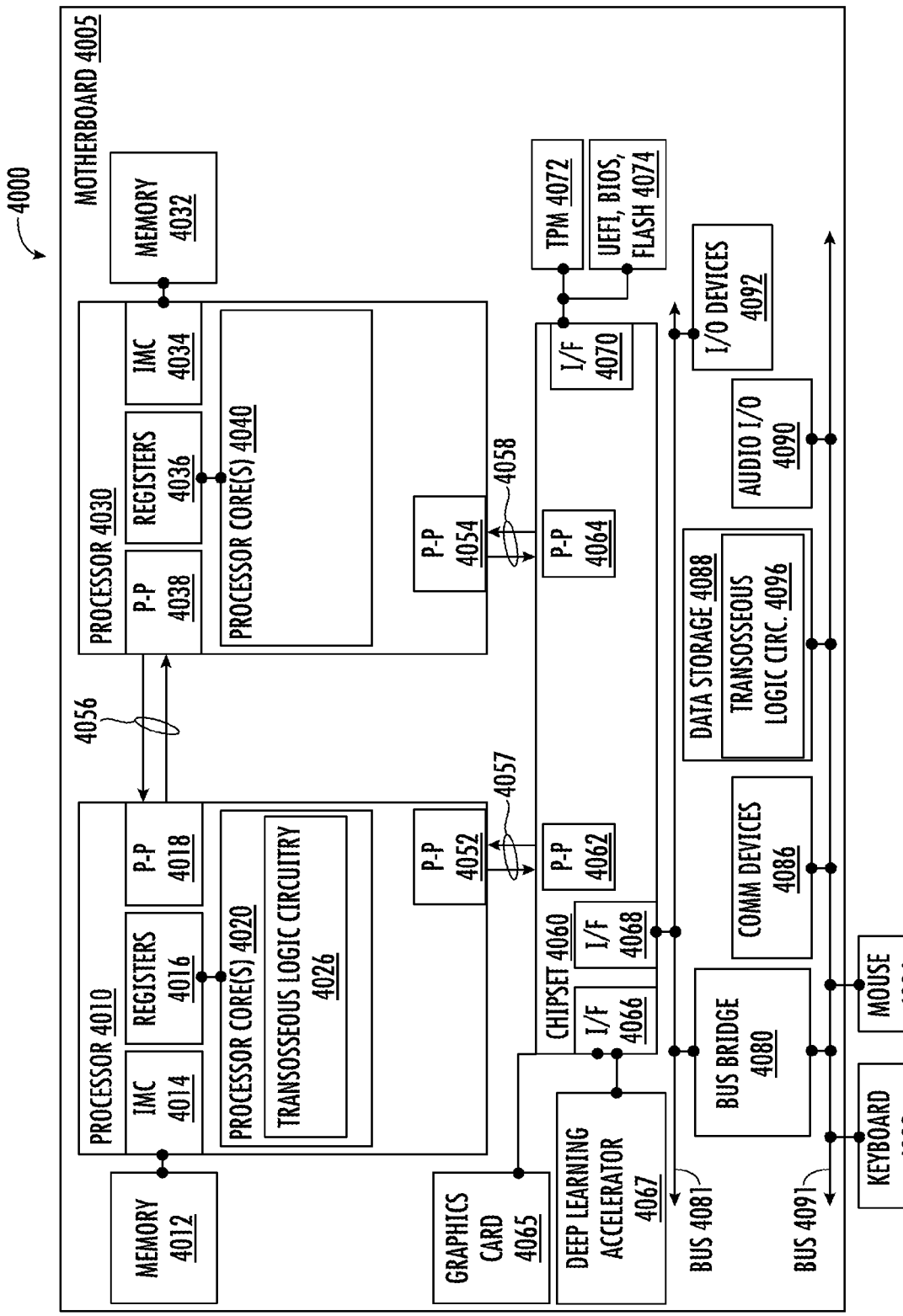
FIG. 4 illustrates a cross-sectional view of an example of a motorized strut that may be used in a spatial frame in accordance with one or more features of the present disclosure in accordance with examples such as the system in FIG. 1.

FIG. 4 illustrates an example of a system 4000 such as the server 130 or HCP device 140 shown in FIG. 1. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar examples may include, e.g., entertainment devices such as a portable music player or a portable video player, a smart phone or other cellular phone, a telephone, a digital video camera, a digital still camera, an external storage device, or the like. Further examples implement larger scale server configurations. In other examples, the system 4000 may have a single processor with one core or more than one processor. Note that the term "processor" refers to a processor with a single core or a processor package with multiple processor cores.

As shown in FIG. 4, system 4000 includes a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other examples, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other examples may include more than two sockets or one socket. For example, some examples may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present example, the memories 4012 and 4032 locally attach to the respective processors 4010 and 4030. In other examples, the main memory may couple with the processors via a bus and shared memory hub.

The processors 4010 and 4030 include caches coupled with each of the processor core(s) 4020 and 4040, respectively. In the present example, the processor core(s) 4020 of the processor 4010 include a transosseous logic circuitry 4026 such as the transosseous logic circuitry discussed in conjunction with FIG. 1A. The transosseous logic circuitry 4026 may represent circuitry configured to implement the functionality of automatically determine levels and positions for transosseous elements within the processor core(s) 4020 or may represent a combination of the circuitry within a processor and a medium to store all or part of the functionality of the transosseous logic circuitry 4026 in memory such as cache, the memory 4012, buffers, registers, and/or the like. In several examples, the functionality of the transosseous logic circuitry 4026 resides in whole or in part as code in a memory such as the transosseous logic circuitry 4096 in the data storage unit 4088 attached to the processor 4010 via a chipset 4060 such as the transosseous logic circuitry 1125 discussed in FIGS. 1-3. The functionality of the transosseous logic circuitry 4026 may also reside in whole or in part in memory such as the memory 4012 and/or a cache of the processor. Furthermore, the functionality of the transosseous logic circuitry 4026 may also reside in whole or in part as circuitry within the processor 4010 and may perform operations, e.g., within registers or buffers such as the registers 4016 within the processor 4010, or within an instruction pipeline of the processor 4010.

In other example, more than one of the processors 4010 and 4030 may include functionality of the transosseous logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other examples, the processors 4010 and 4030 may interconnect via a bus.

The chipset 4060 may include a controller hub such as a platform controller hub (PCH). The chipset 4060 may include a system clock to perform clocking functions and include interfaces for an input/output (I/O)) bus such as a universal serial bus (USB), peripheral component interconnects (PCIs), serial peripheral interconnects (SPIs), integrated interconnects (I2Cs), and the like, to facilitate connection of peripheral devices on the platform. In other examples, the chipset 4060 may include more than one controller hub such as a chipset with a memory controller hub, a graphics controller hub, and an I/O controller hub.

In the present example, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other examples, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In some examples, the second bus 4091 may be a low pin count (LPC) bus. Various devices may couple to the second bus 4091 including, for example, a keyboard 4082, a mouse 4084, communication devices 4086 and a data storage unit 4088 that may store code such as the transosseous logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other examples, some or all the I/O devices 4092, communication devices 4086, and the data storage unit 4088 are add-on peripherals and do not reside on the motherboard 4005.

Figure 5:
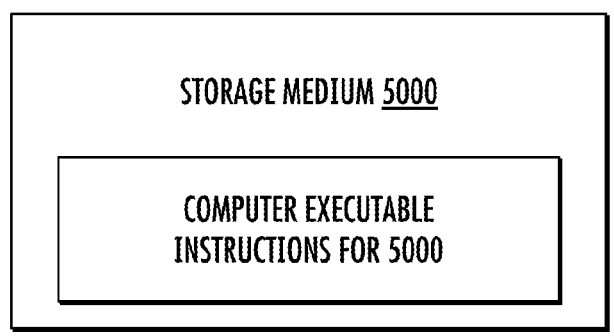
FIG. 5 illustrates a cross-sectional view of an example of a motorized strut that may be used in a spatial frame in accordance with one or more features of the present disclosure in accordance with examples such as the system in FIG. 1.

FIG. 5 illustrates an example of a storage medium 5000 to automatically determine levels and positions for transosseous elements. Storage medium 5000 may include an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
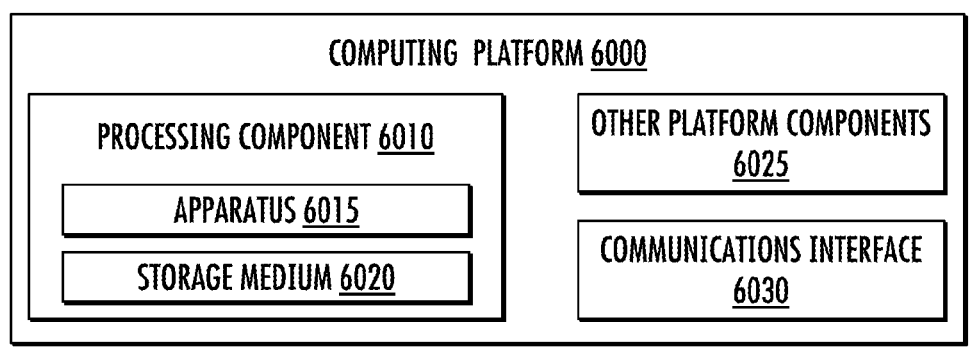
FIG. 6 illustrates a cross-sectional view of an example of a motorized strut that may be used in a spatial frame in accordance with one or more features of the present disclosure in accordance with examples such as the system in FIG. 1.

FIG. 6 illustrates an example computing platform 6000 such as the server 130 or HCP device 140 shown in FIG. 1. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources. Furthermore, the communications interface 6030 may include a wake-up radio (WUR) and may can wake up a main radio of the computing platform 6000.

According to some examples, processing component 6010 may execute processing operations or logic for apparatus 6015 described herein such as the transosseous logic circuitry discussed in conjunction with FIGS. 1-4. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012. Carrier sense Multiple access with Collision Detection (CSMA/CD) Access Method and Physical Layer Specifications. Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various examples of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in examples.

One or more features of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may include discrete electrical components interconnected with one or more conductors, an integrated circuit, a chip package, a chip set, memory, or the like. Integrated circuits include circuits created on a substrate such as a silicon wafer and may include components. And integrated circuits, processor packages, chip packages, and chipsets may include one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may include circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

While the present disclosure refers to certain examples, numerous modifications, alterations, and changes to the described examples are possible without departing from the sphere and scope of the present disclosure, as defined in the appended claim(s). Accordingly, it is intended that the present disclosure not be limited to the described examples, but that it has the full scope defined by the language of the following claims, and equivalents thereof. The discussion of any example is meant only to be explanatory and is not intended to suggest that the scope of the disclosure, including the claims, is limited to these examples. In other words, while illustrative examples of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more examples or configurations for the purpose of streamlining the disclosure. However, it should be understood that various features of the certain examples or configurations of the disclosure may be combined in alternate examples, or configurations. Moreover, the following claims are hereby incorporated into this Detailed Description by this reference, with each claim standing on its own as a separate example of the present disclosure.

As used herein, an element or step recited in the singular and proceeded with the word "a" or "an" should be understood as not excluding plural elements or steps, unless such exclusion is explicitly recited. Furthermore, references to "one example" of the present disclosure are not intended to be interpreted as excluding the existence of additional examples that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below; vertical, horizontal, radial, axial, clockwise, and counterclockwise) are only used for identification purposes to aid the reader's understanding of the present disclosure, and do not create limitations, particularly as to the level, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, levels, positions, order and relative to sizes reflected in the drawings attached hereto may vary.

Further Examples

Example 1 is a method to automatically determine levels and positions for transosseous elements, comprising determining a configuration for an orthopedic device to attach with bone segments, the orthopedic device comprising a proximal ring, a distal ring, and adjustable struts interconnecting the proximal ring and the distal ring; receiving input data for anatomy and boundaries for attachment of the orthopedic device with the bone segments; receiving input data for a level and a position for the proximal ring; determining a number and type of the transosseous elements for attachment of the orthopedic device; determining a final level and position for the distal ring; accessing a first data structure comprising fixations to attach the transosseous elements with the orthopedic device; accessing a second data structure comprising reference (or safe) levels and positions for attachment of the transosseous elements to the bone segments; and automatically determining levels and positions for the transosseous elements and the distal ring based on the configuration for the orthopedic device. In Example 2, the method of Example 1, further comprising adjusting a location of one or more of the fixations, the transosseous elements, the struts, the rings, or a combination thereof. In Example 3, the method of Example 1, further comprising adding, removing, changing, or a combination thereof, one or more of the fixations, the transosseous elements, the struts, the rings, or a combination thereof. In Example 4, the method of Example 1, wherein the boundaries comprise a proximal boundary, an intermediate boundary, a distal boundary, or any combination thereof. In Example 5, the method of Example 1, wherein the number and type of the transosseous elements for attachment of the bone segments with the proximal ring and the distal ring. In Example 6, the method of Example 1, the final level and position for the distal ring to be a level and position after completion of a prescription for the orthopedic device. In Example 7, the method of any one or more of Examples 1-6, the first data structure comprising identifiers and dimensions, the dimensions comprising overall dimensions for each fixation and specific dimensions for one or more transosseous element attachment locations for the fixations. In Example 8, the method of Example 7, wherein the identifiers uniquely identify each of the fixations within the first data structure. In Example 9, the method of Example 1, wherein the levels and positions for the transosseous elements and the distal ring avoid impingement between the fixations, the transosseous elements, and the struts of the orthopedic device while transitioning the distal ring from an initial level and position to the final level and position. In Example 10, the method of Example 9, wherein the levels and positions for the transosseous elements and the distal ring to avoid impingement are based on one or more correction paths. In Example 11, the method of Example 10, wherein the one or more correction paths are based on a prescription provided by a prescription generation software package. In Example 12, the method of Example 10, further comprising generation of the one or more correction paths to avoid impingement of the fixations and the transosseous elements with the struts of the orthopedic device.

Example 13 is an apparatus to automatically determine levels and positions for transosseous elements, comprising a means for determining a configuration for an orthopedic device to attach with bone segments, the orthopedic device comprising a proximal ring, a distal ring, and adjustable struts interconnecting the proximal ring and the distal ring; a means for receiving input data for anatomy and boundaries for attachment of the orthopedic device with the bone segments; a means for receiving input data for a level and a position for the proximal ring; a means for determining a number and type of the transosseous elements for attachment of the orthopedic device; a means for determining a final level and position for the distal ring; a means for accessing a first data structure comprising fixations to attach the transosseous elements with the orthopedic device; a means for accessing a second data structure comprising reference (or safe) levels and positions for attachment of the transosseous elements to the bone segments; and a means for automatically determining levels and positions for the transosseous elements and the distal ring based on the configuration for the orthopedic device. In Example 14, the apparatus of Example 13, further comprising a means for adjusting a location of one or more of the fixations, the transosseous elements, the struts, the rings, or a combination thereof. In Example 15, the apparatus of Example 13, further comprising a means for adding, removing, changing, or a combination thereof, one or more of the fixations, the transosseous elements, the struts, the rings, or a combination thereof. In Example 16, the apparatus of Example 13, wherein the boundaries comprise a proximal boundary, an intermediate boundary, a distal boundary, or any combination thereof. In Example 17, the apparatus of Example 13, wherein the number and type of the transosseous elements for attachment of the bone segments with the proximal ring and the distal ring. In Example 18, the apparatus of Example 13, the final level and position for the distal ring to be a level and position after completion of a prescription for the orthopedic device. In Example 19, the apparatus of any one or more of Examples 13-18, the first data structure comprising identifiers and dimensions, the dimensions comprising overall dimensions for each fixation and specific dimensions for one or more transosseous element attachment locations for the fixations. In Example 20, the apparatus of Example 19, wherein the identifiers uniquely identify each of the fixations within the first data structure. In Example 21, the apparatus of Example 13, wherein the levels and positions for the transosseous elements and the distal ring avoid impingement between the fixations, the transosseous elements, and the struts of the orthopedic device while transitioning the distal ring from an initial level and position to the final level and position. In Example 22, the apparatus of Example 21, wherein the levels and positions for the transosseous elements and the distal ring to avoid impingement are based on one or more correction paths. In Example 23, the apparatus of Example 22, wherein the one or more correction paths are based on a prescription provided by a prescription generation software package. In Example 24, the apparatus of Example 22, further comprising a means for generating of the one or more correction paths to avoid impingement of the fixations and the transosseous elements with the struts of the orthopedic device.

Example 25 is a computer-readable storage medium, comprising a plurality of instructions, that when executed by processing circuitry, enable processing circuitry to determine a configuration for an orthopedic device to attach with bone segments, the orthopedic device comprising a proximal ring, a distal ring, and adjustable struts interconnecting the proximal ring and the distal ring; receive input data for anatomy and boundaries for attachment of the orthopedic device with the bone segments; receive input data for a level and a position for the proximal ring; determine a number and type of transosseous elements for attachment of the orthopedic device; determine a final level and position for the distal ring; access a first data structure comprising fixations to attach the transosseous elements with the orthopedic device; access a second data structure comprising reference (or safe) levels and positions for attachment of the transosseous elements to the bone segments; and automatically determine levels and positions for the transosseous elements and the distal ring based on the configuration for the orthopedic device. In Example 26, the computer-readable storage medium of Example 25, wherein the processing circuitry is further enabled to adjust a location of one or more of the fixations, the transosseous elements, the struts, the rings, or a combination thereof. In Example 27, the computer-readable storage medium of Example 25, wherein the processing circuitry is further enabled to add, remove, change, or a combination thereof, one or more of the fixations, the transosseous elements, the struts, the rings, or a combination thereof. In Example 28, the computer-readable storage medium of Example 25, wherein the boundaries comprise a proximal boundary, an intermediate boundary, a distal boundary, or any combination thereof. In Example 29, the computer-readable storage medium of Example 25, wherein the number and type of the transosseous elements for attachment of the bone segments with the proximal ring and the distal ring. In Example 30, the computer-readable storage medium of Example 25, the final level and position for the distal ring to be a level and position after completion of a prescription for the orthopedic device. In Example 31, the computer-readable storage medium of any one or more of Examples 25-30, the first data structure comprising identifiers and dimensions, the dimensions comprising overall dimensions for each fixation and specific dimensions for one or more transosseous element attachment locations for the fixations. In Example 32, the computer-readable storage medium of Example 31, wherein the identifiers uniquely identify each of the fixations within the first data structure. In Example 33, the computer-readable storage medium of Example 25, wherein the levels and positions for the transosseous elements and the distal ring avoid impingement between the fixations, the transosseous elements, and the struts of the orthopedic device while transitioning the distal ring from an initial level and position to the final level and position. In Example 34, the computer-readable storage medium of Example 33, wherein the levels and positions for the transosseous elements and the distal ring to avoid impingement are based on one or more correction paths. In Example 35, the computer-readable storage medium of Example 34, wherein the one or more correction paths are based on a prescription provided by a prescription generation software package. In Example 36, the computer-readable storage medium of Example 34, wherein the processing circuitry is further enabled to generate the one or more correction paths to avoid impingement of the fixations and the transosseous elements with the struts of the orthopedic device.

Example 37 is an apparatus to automatically determine levels and positions for transosseous elements, comprising a memory; and logic circuitry coupled with the memory to perform operations to determine a configuration for an orthopedic device to attach with bone segments, the orthopedic device comprising a proximal ring, a distal ring, and adjustable struts interconnecting the proximal ring and the distal ring; receive input data for anatomy and boundaries for attachment of the orthopedic device with the bone segments; receive input data for a level and a position for the proximal ring; determine a number and type of the transosseous elements for attachment of the orthopedic device; determine a final level and position for the distal ring; access a first data structure comprising fixations to attach the transosseous elements with the orthopedic device; access a second data structure comprising reference (or safe) levels and positions for attachment of the transosseous elements to the bone segments; and automatically determine levels and positions for the transosseous elements and the distal ring based on the configuration for the orthopedic device. In Example 38, the apparatus of Example 37, wherein the logic circuitry is further configured to adjust a location of one or more of the fixations, the transosseous elements, the struts, the rings, or a combination thereof. In Example 39, the apparatus of Example 37, wherein the logic circuitry is further configured to add, remove, change, or a combination thereof, one or more of the fixations, the transosseous elements, the struts, the rings, or a combination thereof. In Example 40, the apparatus of Example 37, wherein the boundaries comprise a proximal boundary, an intermediate boundary, a distal boundary, or any combination thereof. In Example 41, the apparatus of Example 37, wherein the number and type of the transosseous elements for attachment of the bone segments with the proximal ring and the distal ring. In Example 42, the apparatus of Example 37, the final level and position for the distal ring to be a level and position after completion of a prescription for the orthopedic device. In Example 43, the apparatus of any one or more of Examples 37-42, the first data structure comprising identifiers and dimensions, the dimensions comprising overall dimensions for each fixation and specific dimensions for one or more transosseous element attachment locations for the fixations. In Example 44, the apparatus of Example 43, wherein the identifiers uniquely identify each of the fixations within the first data structure. In Example 45, the apparatus of Example 37, wherein the levels and positions for the transosseous elements and the distal ring avoid impingement between the fixations, the transosseous elements, and the struts of the orthopedic device while transitioning the distal ring from an initial level and position to the final level and position. In Example 46, the apparatus of Example 45, wherein the levels and positions for the transosseous elements and the distal ring to avoid impingement are based on one or more correction paths. In Example 47, the apparatus of Example 46, wherein the one or more correction paths are based on a prescription provided by a prescription generation software package. In Example 48, the apparatus of Example 46, wherein the logic circuitry is further configured to generate the one or more correction paths to avoid impingement of the fixations and the transosseous elements with the struts of the orthopedic device.

The invention claimed is:

1. A method to automatically determine levels and positions for transosseous elements, comprising: providing a computer-readable storage medium, comprising a plurality of instructions, that when executed by processing circuitry, enable processing circuitry to: determining a configuration for an orthopedic device to attach with bone segments, the orthopedic device comprising a proximal ring, a distal ring, and adjustable struts interconnecting the proximal ring and the distal ring; receiving input data for anatomy and boundaries for attachment of the orthopedic device with the bone segments; receiving input data for a level and a position for the proximal ring; determining a number and type of the transosseous elements for attachment of the orthopedic device; determining a final level and position for the distal ring; accessing a first data structure comprising fixations to attach the transosseous elements with the orthopedic device; accessing a second data structure comprising reference levels and positions for attachment of the transosseous elements to the bone segments; and automatically determining levels and positions for the transosseous elements and the distal ring based on the configuration for the orthopedic device.

2. The method of claim 1, further comprising adjusting a location of one or more of the fixations, the transosseous elements, the struts, the rings, or a combination thereof.

3. The method of claim 1, further comprising adding, removing, changing, or a combination thereof, one or more of the fixations, the transosseous elements, the struts, the rings, or a combination thereof.

4. The method of claim 1, wherein the boundaries comprise a proximal boundary, an intermediate boundary, a distal boundary, or any combination thereof.

5. The method of claim 1, wherein the first data structure comprises identifiers and dimensions, the dimensions comprising overall dimensions for each fixation and specific dimensions for one or more transosseous element attachment locations for the fixations.

6. A computer-readable storage medium, comprising a plurality of instructions, that when executed by processing circuitry, enable processing circuitry to:
    determine a configuration for an orthopedic device to attach with bone segments, the orthopedic device comprising a proximal ring, a distal ring, and adjustable struts interconnecting the proximal ring and the distal ring;
    receive input data for anatomy and boundaries for attachment of the orthopedic device with the bone segments;
    receive input data for a level and a position for the proximal ring;
    determine a number and type of transosseous elements for attachment of the orthopedic device;
    determine a final level and position for the distal ring;
    access a first data structure comprising fixations to attach the transosseous elements with the orthopedic device;
    access a second data structure comprising reference levels and positions for attachment of the transosseous elements to the bone segments; and
    automatically determine levels and positions for the transosseous elements and the distal ring based on the configuration for the orthopedic device.

7. The computer-readable storage medium of claim 6, wherein the processing circuitry is further enabled to adjust a location of one or more of the fixations, the transosseous elements, the struts, the rings, or a combination thereof, wherein the processing circuitry is further enabled to add, remove, change, or a combination thereof, one or more of the fixations, the transosseous elements, the struts, the rings, or a combination thereof.

8. The computer-readable storage medium of claim 6, wherein the number and type of the transosseous elements for attachment of the bone segments with the proximal ring and the distal ring.

9. The computer-readable storage medium of claim 6, the final level and position for the distal ring to be a level and position after completion of a prescription for the orthopedic device.

10. The computer-readable storage medium of claim 6, wherein the first data structure comprises identifiers and dimensions, the dimensions comprising overall dimensions for each fixation and specific dimensions for one or more transosseous element attachment locations for the fixations, wherein the identifiers uniquely identify each of the fixations within the first data structure.

11. An apparatus to automatically determine levels and positions for transosseous elements, comprising:
a memory; and
logic circuitry coupled with the memory to perform operations to:
determine a configuration for an orthopedic device to attach with bone segments, the orthopedic device comprising a proximal ring, a distal ring, and adjustable struts interconnecting the proximal ring and the distal ring;
receive input data for anatomy and boundaries for attachment of the orthopedic device with the bone segments;
receive input data for a level and a position for the proximal ring;
determine a number and type of the transosseous elements for attachment of the orthopedic device;
determine a final level and position for the distal ring;
access a first data structure comprising fixations to attach the transosseous elements with the orthopedic device;
access a second data structure comprising reference levels and positions for attachment of the transosseous elements to the bone segments; and
automatically determine levels and positions for the transosseous elements and the distal ring based on the configuration for the orthopedic device.

12. The apparatus of claim 11, wherein the levels and positions for the transosseous elements and the distal ring avoid impingement between the fixations, the transosseous elements, and the struts of the orthopedic device while transitioning the distal ring from an initial level and position to the final level and position.

13. The apparatus of claim 12, wherein the levels and positions for the transosseous elements and the distal ring to avoid impingement are based on one or more correction paths.

14. The apparatus of claim 13, wherein the one or more correction paths are based on a prescription provided by a prescription generation software package.

15. The apparatus of claim 13, wherein the logic circuitry is further configured to generate the one or more correction paths to avoid impingement of the fixations and the transosseous elements with the struts of the orthopedic device.

* * * * *